(12) United States Patent
Lei et al.

(10) Patent No.: US 12,317,336 B2
(45) Date of Patent: *May 27, 2025

(54) WAVEFORM CONFIGURATION AND INDICATION FOR UPLINK TRANSMISSION

(71) Applicant: QUALCOMM Incorporated, San Diego, CA (US)

(72) Inventors: Jing Lei, San Diego, CA (US); Seyong Park, San Diego, CA (US); Hung Dinh Ly, San Diego, CA (US); Wei Yang, San Diego, CA (US); Linhai He, San Diego, CA (US); Joseph Binamira Soriaga, San Diego, CA (US); Wanshi Chen, San Diego, CA (US); Ruiming Zheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,549

(22) Filed: Jun. 18, 2024

(65) Prior Publication Data

US 2024/0340970 A1 Oct. 10, 2024

Related U.S. Application Data

(63) Continuation of application No. 17/441,707, filed as application No. PCT/CN2020/080423 on Mar. 20, 2020, now Pat. No. 12,035,374.

(30) Foreign Application Priority Data

Mar. 26, 2019 (WO) ................ PCT/CN2019/079657

(51) Int. Cl.
*H04H 20/71* (2008.01)
*H04L 5/00* (2006.01)
(Continued)

(52) U.S. Cl.
CPC ....... *H04W 74/0833* (2013.01); *H04L 5/0051* (2013.01); *H04W 48/10* (2013.01)

(58) Field of Classification Search
CPC . H04W 74/0833; H04W 48/10; H04W 48/12; H04L 5/0051; H04L 5/0033;
(Continued)

(56) References Cited

U.S. PATENT DOCUMENTS 9,294,932 B2 * 3/2016 Walker ................. H04W 16/28
10,506,596 B2 * 12/2019 Yerramalli ............ H04W 16/14
(Continued)

FOREIGN PATENT DOCUMENTS

CN     106713204 A    5/2017
CN     108023709 A    5/2018
(Continued)

OTHER PUBLICATIONS

International Preliminary Report on Patentability—PCT/CN2020/080423 The International Bureau of WIPO—Geneva, Switzerland, Oct. 7, 2021.
(Continued)

*Primary Examiner* — Amancio Gonzalez
(74) *Attorney, Agent, or Firm* — Holland & Hart LLP/Qualcomm

(57) ABSTRACT

Wireless communications systems may support flexible waveform configuration for autonomous uplink transmissions. A base station may transmit broadcast signaling (e.g., a system information block (SIB)) indicating waveform configuration information for an autonomous uplink transmission by a user equipment (UE). In some cases, the broadcast signaling may include a waveform configuration field (WCF) that may indicate whether flexible waveforms for autonomous uplink are supported, may configure a waveform type, may indicate waveform configuration map-
(Continued)

ping rules, etc. As such, a UE may identify whether flexible waveform configuration for autonomous uplink is supported, and may determine waveform types for autonomous uplink transmissions based on waveform type configuration information from a base station (e.g., which may include an indication of whether flexible waveform configuration is supported, an indication of waveform type/scenario mapping rules, etc.), one or more LUTs, identified autonomous uplink scenarios, autonomous uplink transmission parameters, or some combination thereof.

30 Claims, 19 Drawing Sheets

(51) Int. Cl.
*H04W 48/10* (2009.01)
*H04W 74/0833* (2024.01)

(58) Field of Classification Search
CPC . H04L 27/2602; H04L 27/2646; H04L 5/001;
H04L 5/0026; H04L 5/0048; H04L 5/0069; H04L 27/2636; H04L 5/0028; H04L 5/14; H04L 27/0008; H04L 27/0012; H04L 5/0091
USPC .......................................................... 370/312
See application file for complete search history.

(56) References Cited

U.S. PATENT DOCUMENTS

| | | | |
|---|---|---|---|
| 10,939,441 B2* | 3/2021 | Bhattad | H04W 74/08 |
| 10,965,424 B2* | 3/2021 | Fan | H04L 5/0053 |
| 11,038,567 B2* | 6/2021 | Zhang | H04L 1/0009 |
| 11,178,615 B2* | 11/2021 | Piipponen | H04W 48/10 |
| 11,265,901 B2* | 3/2022 | Freda | H04W 72/23 |
| 11,304,182 B2* | 4/2022 | Cheng | H04L 5/0053 |
| 11,388,629 B2* | 7/2022 | Simon | H04L 7/027 |
| 11,483,810 B2* | 10/2022 | Zhang | H04L 1/0031 |
| 11,483,870 B2 | 10/2022 | Lei et al. | |
| 11,489,637 B2* | 11/2022 | Davydov | H04L 27/0008 |
| 2019/0261315 A1 | 8/2019 | Zhang et al. | |
| 2019/0274158 A1 | 9/2019 | Tang et al. | |
| 2022/0167425 A1 | 5/2022 | Lei et al. | |

FOREIGN PATENT DOCUMENTS

| | | |
|---|---|---|
| CN | 108064049 A | 5/2018 |
| CN | 108271214 A | 7/2018 |
| CN | 108289018 A | 7/2018 |
| CN | 108811149 A | 11/2018 |
| CN | 109792422 A | 5/2019 |
| EP | 3902320 A1 | 10/2021 |
| WO | WO-2017219320 A1 | 12/2017 |
| WO | 2018081954 A1 | 5/2018 |
| WO | WO2018083868 A1 | 5/2018 |
| WO | WO2018094094 | 5/2018 |
| WO | WO2018126972 A1 | 7/2018 |
| WO | WO2018131985 A1 | 7/2018 |
| WO | WO-2020223843 A1 | 11/2020 |

OTHER PUBLICATIONS

International Preliminary Report on Patentability—PCT/CN2019/079657 The International Bureau of WIPO—Geneva, Switzerland, Oct. 7, 2021.
International Search Report and Written Opinion—PCT/CN2019/079657—ISA/EPO—Dec. 17, 2019.
International Search Report and Written Opinion—PCT/CN2020/080423—ISAEPO—Jun. 29, 2020.
Nokia, et al., "On 2-Step RACH Procedure", 3GPP Draft, 3GPP TSG RAN WG1 Meeting #96, R1-1902136, On 2-step RACH Procedure, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051599831, 10 pages.
Supplementary European Search Report—EP20779934—Search Authority—Berlin—Nov. 21, 2022.
ZTE: "Summary of 7.2.1.1 Channel Structure for Two-Step RACH", 3GPP TSG RAN WG1 #96, R1-1903435, 3rd Generation Partnership Project, Mobile Competence Centre, 650, Route Des Lucioles, F-06921 Sophia-Antipolis Cedex, France, Athens, Greece, Feb. 25-Mar. 1, 2019, Mar. 1, 2019, XP051690819, Mar. 3, 2019, 28 Pages, p. 5, para 2.4.2, Chapters 1, 2.1, 2.2, 2.4.2, 2.6, Appendices A and B, the whole document.

* cited by examiner

WAVEFORM CONFIGURATION AND INDICATION FOR UPLINK TRANSMISSION

CROSS REFERENCE TO RELATED APPLICATIONS

The present application for patent claims priority to U.S. patent application Ser. No. 17/441,707 by LEI et al., entitled "WAVEFORM CONFIGURATION AND INDICATION FOR UPLINK TRANSMISSION" filed Sep. 22, 2021, which is a 371 national stage filing of International Patent Application No. PCT/CN2020/080423 by Lei et. al., entitled "WAVEFORM CONFIGURATION AND INDICATION FOR UPLINK TRANSMISSION," filed Mar. 20, 2020, and claims priority to International Patent Application No. PCT/CN2019/079657 by Lei et. al., entitled "WAVEFORM CONFIGURATION AND INDICATION FOR UPLINK TRANSMISSION," filed Mar. 26, 2019, each of which is assigned to the assignee hereof, and each of which is expressly incorporated by reference in its entirety herein.

BACKGROUND

The following relates generally to wireless communications, and more specifically to waveform configuration and indication for uplink transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support one or more random access procedures for communication between a UE and a base station. A random access procedure may be used in an initial access procedure to establish a connection between the UE and base station, a connection re-establishment procedure, a handover procedure, a synchronization procedure, etc. The random access procedures may involve a series of handshake messages exchanged between the UE and the base station. Random access procedures may be contention-based using a shared pool of resources and preamble sequences, or non-contention-based where a UE may transmit one or more messages based on a reserved preamble sequence or set of resources. In some implementations (e.g., unlicensed spectrum band operations), the UE may perform channel sensing (e.g., a listen-before-talk (LBT) procedure) before transmitting one or more messages on available resources of the channel, as part of the exchange.

As demand for communication access increases, a wireless communications system may support methods for reducing the number of handshake messages exchanged between a UE and a base station. The shortened random access procedure (e.g., a two-step random access procedure) may reduce potential delays for channel access, particularly for contention-based procedures. Efficient techniques for performing such random access procedures may help to enhance network efficiency.

SUMMARY

The described techniques relate to improved methods, systems, devices, and apparatuses that support waveform configuration and indication for uplink transmission. Generally, the described techniques may provide for flexible waveform configuration for autonomous uplink transmissions. For example, in a two-step random access procedure, a user equipment (UE) may autonomously (e.g., grant-free, contention-based) transmit an initial random access message (e.g., such as a MsgA, which may include a random access preamble and a random access payload) to a base station according to a waveform configuration.

A base station may transmit broadcast signaling (e.g., a system information block (SIB1)) indicating a waveform configuration associated with some set of supported waveform types for an autonomous uplink transmission by a UE. In some cases, the broadcast signaling may include a waveform configuration field (WCF) that may convey waveform configuration information. The WCF may indicate whether flexible waveforms for autonomous uplink are supported, may explicitly configure a waveform type, may indicate waveform configuration mapping rules, etc. In some cases, one or more look up tables (LUTs) may include waveform configuration information, and the WCF may indicate whether flexible waveforms for autonomous uplink are supported and may implicitly configure a waveform type (e.g., via referencing a LUT, or by being aware of one or more LUTs maintained by the UE).

As such, a UE may determine a waveform configuration (e.g., a waveform type to use for an autonomous uplink transmission) based on the received signaling (e.g., waveform configuration information) from the base station. For example, a UE may identify waveform configuration information from a WCF, may determine an autonomous uplink scenario, or both, to determine a waveform configuration for an autonomous uplink transmission. As used herein, an autonomous uplink scenario may refer to channel parameters determined from performed channel measurements, a radio resource control (RRC) state of the UE, a capability tier of the UE associated with an autonomous uplink transmission, a cell size associated with the received broadcast signaling, a position of the UE within the cell determined from positioning measurements, etc. In some cases, waveforms for autonomous uplink transmission may be configured based on autonomous uplink transmission parameters used by the UE. As used herein, autonomous uplink transmission parameters may refer to a modulation coding scheme (MCS), a preamble sequence, a demodulation reference signal (DMRS) sequence, time resources, frequency resources, a payload size, etc. used by the UE for an autonomous uplink transmission.

For example, a UE may identify a WCF in a SIB1, may determine that flexible waveforms for autonomous uplink are supported, and may identify waveform configurations for autonomous uplink transmissions from the WCF. In other examples, a UE may identify a WCF, may determine that flexible waveforms for autonomous uplink are supported, and may reference a LUT based on an autonomous uplink transmission scenario at the UE and/or based on autonomous uplink transmission parameters (e.g., as waveform configurations may be specified by the network for various autonomous uplink transmission scenarios and/or autonomous uplink transmission parameters). In other examples, a UE may identify a WCF, may determine that flexible waveforms for autonomous uplink are supported, and may identify waveform configuration/scenario mapping information from WCF (and may determine a waveform configuration based on the waveform configuration/scenario mapping information and the identified autonomous uplink scenario and/or autonomous uplink transmission parameters).

That is, in some cases, a UE may identify a mapping between one or more scenarios determined at the UE (e.g., autonomous uplink scenarios) and one or more corresponding waveform types (e.g., cyclic prefix-orthogonal frequency division multiplexing (CP-OFDM) waveform type or discrete Fourier transform-spread-DFT-s-orthogonal frequency division multiplexing (DFT-s-OFDM) waveform type) of the plurality of supported waveform types, and the waveform type for transmitting an autonomous uplink transmission may be determined based on the mapping. In some cases, the mapping between the one or more scenarios determined at the UE and the one or more corresponding waveform types may be based on received broadcast signaling (e.g., a SIB1 or other configuration information), additional broadcast signaling, radio resource control signaling, or a combination thereof. Further, the UE may determine a scenario at the UE (e.g., an autonomous uplink scenario), where the waveform type for transmitting an autonomous uplink transmission may be determined based on the scenario at the UE. As discussed herein, the scenario may include or refer to downlink channel measurements performed by the UE, positioning measurements, a timing offset value, a radio resource control state of the UE, a capability tier of the UE, a cell size associated with the received broadcast signaling, etc. In some cases, the waveform configuration may be determined based on transmission parameters to be used by the UE for an autonomous uplink transmission. For example, the UE may determine a waveform configuration based on an MCS, preamble/DMRS sequence, time/frequency resources, etc., that are to be used for an autonomous uplink transmission.

As discussed herein, the waveform configuration may be determined based on the transmission parameters and a mapping between the transmission parameters and a waveform type. In some cases, the scenarios and the waveform type mapping for one or more of the scenarios may be included in a LUT, may be indicated in a WCF, may be indicated by other base station signaling (e.g., RRC signaling, other broadcast information), etc. As such, the UE may identify whether flexible waveform configuration for autonomous uplink is supported, and may determine waveform types (e.g., CP-OFDM or DFT-s-OFDM) for autonomous uplink transmissions based on an explicit waveform type configuration from a base station (which may include an indication of whether flexible waveform configuration is supported, an indication of waveform type/scenario mapping rules, etc.), one or more LUTs, identified autonomous uplink scenarios, autonomous uplink transmission parameters, or some combination thereof.

A method of wireless communications at a UE is described. The method may include receiving broadcast signaling indicating a waveform configuration associated with a set of supported waveform types for an autonomous uplink transmission, determining a waveform type of the set of supported waveform types for transmitting the autonomous uplink transmission based on the waveform configuration, and transmitting the autonomous uplink transmission according to the determined waveform type.

An apparatus for wireless communications at a UE is described. The apparatus may include a processor, memory coupled with the processor, and instructions stored in the memory. The instructions may be executable by the processor to cause the apparatus to receive broadcast signaling indicating a waveform configuration associated with a set of supported waveform types for an autonomous uplink transmission, determine a waveform type of the set of supported waveform types for transmitting the autonomous uplink transmission based on the waveform configuration, and transmit the autonomous uplink transmission according to the determined waveform type.

Another apparatus for wireless communications at a UE is described. The apparatus may include means for receiving broadcast signaling indicating a waveform configuration associated with a set of supported waveform types for an autonomous uplink transmission, determining a waveform type of the set of supported waveform types for transmitting the autonomous uplink transmission based on the waveform configuration, and transmitting the autonomous uplink transmission according to the determined waveform type.

A non-transitory computer-readable medium storing code for wireless communications at a UE is described. The code may include instructions executable by a processor to receive broadcast signaling indicating a waveform configuration associated with a set of supported waveform types for an autonomous uplink transmission, determine a waveform type of the set of supported waveform types for transmitting the autonomous uplink transmission based on the waveform configuration, and transmit the autonomous uplink transmission according to the determined waveform type.

Some examples of the method, apparatuses, and non-transitory computer-readable medium described herein may further include operations, features, means, or instructions for identifying a mapping between one or more scenarios determined at the UE and one or more corresponding waveform types of the set of supported waveform types, where determining the waveform type for transmitting the autonomous uplink transmission may be based on the mapping. Some examples of the method, apparatuses, and non-transitory computer-readable medium described herein may further include operations, features, means, or instructions for identifying the mapping between the one or more scenarios determined at the UE and the one or more corresponding waveform types based on the received broadcast signaling, additional broadcast signaling, radio resource control signaling, or a combination thereof.

Some examples of the method, apparatuses, and non-transitory computer-readable medium described herein may further include operations, features, means, or instructions for determining a scenario at the UE, where determining the waveform type for transmitting the autonomous uplink transmission may be based on the scenario at the UE. In some examples of the method, apparatuses, and non-transitory computer-readable medium described herein, the scenario at the UE includes downlink channel measurements performed by the UE, positioning measurements, a timing offset value, a radio resource control state of the UE, a capability tier of the UE, a cell size associated with the received broadcast signaling, or a combination thereof.

Some examples of the method, apparatuses, and non-transitory computer-readable medium described herein may further include operations, features, means, or instructions for decoding a waveform configuration field from the broadcast signaling, where the waveform configuration field indicates whether flexible waveform configuration may be available to the UE. In some examples of the method, apparatuses, and non-transitory computer-readable medium described herein, the waveform configuration field includes a flag bit that indicates that flexible waveform configuration may be available to the UE with a first bit value and that indicates a default waveform configuration with a second bit value.

In some examples of the method, apparatuses, and non-transitory computer-readable medium described herein, the waveform configuration field further includes a set of scenario bits, where each scenario bit of the set of scenario bits indicates for each corresponding scenario a first waveform type of the set of supported waveform types with a first bit value and indicates a second waveform type of the set of supported waveform types with a second bit value. In some examples of the method, apparatuses, and non-transitory computer-readable medium described herein, the waveform configuration field further includes a set of indexes, where each index of the set of indexes indicates a scenario for using a waveform type that differs from a default waveform type.

Some examples of the method, apparatuses, and non-transitory computer-readable medium described herein may further include operations, features, means, or instructions for identifying a mapping between one or more of the set of supported waveform types and one or more transmission parameters for transmitting the autonomous uplink transmission from one or more look up tables stored at the UE, where transmitting the autonomous uplink transmission may be based on the one or more transmission parameters corresponding to the determined waveform type from the one or more look up tables.

In some examples of the method, apparatuses, and non-transitory computer-readable medium described herein, the one or more transmission parameters for transmitting the autonomous uplink transmission include a set of preamble sequences, a set of demodulation reference signal sequences, time-frequency resources for transmitting a payload of the autonomous uplink transmission, or a combination thereof. Some examples of the method, apparatuses, and non-transitory computer-readable medium described herein may further include operations, features, means, or instructions for receiving signaling indicating which of the one or more look up tables may be applicable to the autonomous uplink transmission. Some examples of the method, apparatuses, and non-transitory computer-readable medium described herein may further include operations, features, means, or instructions for identifying that a single waveform type of the set of supported waveform types may be configured for the autonomous uplink transmission based on the received broadcast signaling.

In some examples of the method, apparatuses, and non-transitory computer-readable medium described herein, the waveform configuration includes a waveform configuration field, a transmission occasion configuration for the autonomous uplink transmission, additional system information for the autonomous uplink transmission, or a combination thereof. In some examples of the method, apparatuses, and non-transitory computer-readable medium described herein, the broadcast signaling includes a system information block. In some examples of the method, apparatuses, and non-transitory computer-readable medium described herein, the autonomous uplink transmission includes a first message of a two-step random access procedure. In some examples of the method, apparatuses, and non-transitory computer-readable medium described herein, the set of supported waveform types include a cyclic-prefix orthogonal frequency division multiplexing waveform and a discrete Fourier transform spread orthogonal frequency division multiplexing waveform.

A method of wireless communications at a base station is described. The method may include determining a waveform type of a set of supported waveform types for an autonomous uplink transmission, transmitting broadcast signaling indicating a waveform configuration associated with the set of supported waveform types for the autonomous uplink transmission, and receiving the autonomous uplink transmission according to the determined waveform type.

An apparatus for wireless communications at a base station is described. The apparatus may include a processor, memory coupled with the processor, and instructions stored in the memory. The instructions may be executable by the processor to cause the apparatus to determine a waveform type of a set of supported waveform types for an autonomous uplink transmission, transmit broadcast signaling indicating a waveform configuration associated with the set of supported waveform types for the autonomous uplink transmission, and receive the autonomous uplink transmission according to the determined waveform type.

Another apparatus for wireless communications at a base station is described. The apparatus may include means for determining a waveform type of a set of supported waveform types for an autonomous uplink transmission, transmitting broadcast signaling indicating a waveform configuration associated with the set of supported waveform types for the autonomous uplink transmission, and receiving the autonomous uplink transmission according to the determined waveform type.

A non-transitory computer-readable medium storing code for wireless communications at a base station is described. The code may include instructions executable by a processor to determine a waveform type of a set of supported waveform types for an autonomous uplink transmission, transmit broadcast signaling indicating a waveform configuration associated with the set of supported waveform types for the autonomous uplink transmission, and receive the autonomous uplink transmission according to the determined waveform type.

Some examples of the method, apparatuses, and non-transitory computer-readable medium described herein may further include operations, features, means, or instructions for identifying a mapping between one or more scenarios determined at a UE and one or more corresponding waveform types of the set of supported waveform types, where determining the waveform type of the set of supported waveform types may be based on the mapping. Some examples of the method, apparatuses, and non-transitory computer-readable medium described herein may further include operations, features, means, or instructions for transmitting an indication of the mapping between the one or more scenarios determined at the UE and the one or more corresponding waveform types via the broadcast signaling, additional broadcast signaling, radio resource control signaling, or a combination thereof.

In some examples of the method, apparatuses, and non-transitory computer-readable medium described herein, the one or more scenarios determined at the UE includes downlink channel measurements performed by the UE, positioning measurements, a timing offset value, a radio resource control state of the UE, a capability tier of the UE, a cell size associated with the received broadcast signaling, or a combination thereof. In some examples of the method, apparatuses, and non-transitory computer-readable medium described herein, the broadcast signaling includes a waveform configuration field indicating whether flexible waveform configuration may be available to a UE.

In some examples of the method, apparatuses, and non-transitory computer-readable medium described herein, the waveform configuration field includes a flag bit that indicates that flexible waveform configuration may be available to the UE with a first bit value and that indicates a default waveform configuration with a second bit value. In some examples of the method, apparatuses, and non-transitory computer-readable medium described herein, the waveform configuration field further includes a set of scenario bits, where each scenario bit of the set of scenario bits indicates for each corresponding scenario a first waveform type of the set of supported waveform types with a first bit value and indicates a second waveform type of the set of supported waveform types with a second bit value.

In some examples of the method, apparatuses, and non-transitory computer-readable medium described herein, the waveform configuration field further includes a set of indexes, where each index of the set of indexes indicates a scenario for using a waveform type that differs from a default waveform type. Some examples of the method, apparatuses, and non-transitory computer-readable medium described herein may further include operations, features, means, or instructions for identifying a mapping between one or more of the set of supported waveform types and one or more UE transmission parameters for transmitting the autonomous uplink transmission from one or more look up tables stored at a UE, where the autonomous uplink transmission may be received based on the one or more UE transmission parameters corresponding to the determined waveform type from the one or more look up tables.

Some examples of the method, apparatuses, and non-transitory computer-readable medium described herein may further include operations, features, means, or instructions for transmitting signaling indicating which of the one or more look up tables may be applicable to the autonomous uplink transmission. In some examples of the method, apparatuses, and non-transitory computer-readable medium described herein, the broadcast signaling indicates a single waveform type of the set of supported waveform types may be configured for the autonomous uplink transmission. In some examples of the method, apparatuses, and non-transitory computer-readable medium described herein, the waveform configuration includes a waveform configuration field, a transmission occasion configuration for the autonomous uplink transmission, additional system information for the autonomous uplink transmission, or a combination thereof.

In some examples of the method, apparatuses, and non-transitory computer-readable medium described herein, the broadcast signaling includes a system information block. In some examples of the method, apparatuses, and non-transitory computer-readable medium described herein, the autonomous uplink transmission includes a first message of a two-step random access procedure. In some examples of the method, apparatuses, and non-transitory computer-readable medium described herein, the set of supported waveform types include a cyclic-prefix orthogonal frequency division multiplexing waveform and a discrete Fourier transform spread orthogonal frequency division multiplexing waveform.

DETAILED DESCRIPTION

Figure 1:
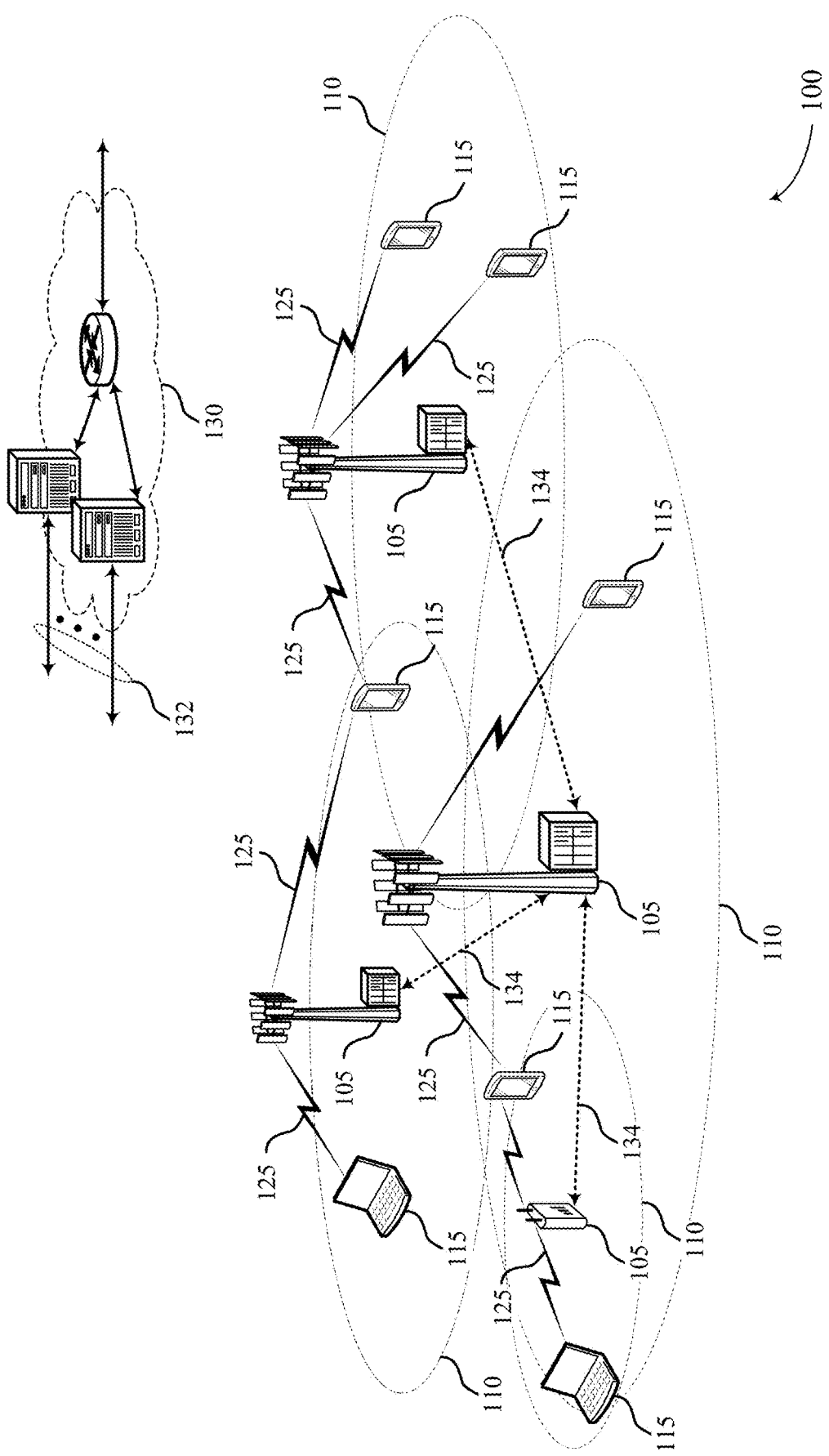
FIG. 1 illustrates an example of a system for wireless communications that supports waveform configuration and indication for uplink transmission in accordance with aspects of the present disclosure.

A user equipment (UE) may perform a random access procedure (RACH procedure) with a base station to access a wireless network, for example, when initially accessing the wireless network or during a handover. In some cases, a random access procedure may be performed as a four-step random access procedure. According to the four-step random access procedure, the UE may transmit, to the base station, a first message (e.g., Msg1), which may be referred to as a random access request message. In response, the base station may transmit, to the UE, a second message (e.g., Msg2), which may be referred to as a random access response message. The second message may include a grant of uplink resources for the UE to transmit, to the base station, a third message. The third message (e.g., Msg3) may be referred to as a radio resource control (RRC) message, and may request a new or reconfigured connection with the base station. The base station may then transmit, to the UE, a fourth message (e.g., Msg4), which may be referred to as a contention resolution message or other downlink signaling, to confirm the requested new or reconfigured connection. After successfully performing the random access procedure, the UE and the base station may establish a data connection to communicate subsequent transmissions of data and other communications. That is, the UE and the base station may establish an RRC configuration for the data connection, and the base station may allocate resources (e.g., time, frequency, and/or spatial resources) for uplink control transmissions such as scheduling requests. After the random access procedure, the UE may be in a connected state with the base station.

In some cases, alternatively to a four-step random access procedures, the UE may be configured to perform a two-step random access procedure. For example, the UE may use the two-step random access procedure when an amount of data to be transferred is below a threshold amount of data, to reduce random access procedure overhead, to reduce random access procedure latency, etc. In a two-step random access procedure the UE and the base station may exchange fewer messages than in a four-step random access procedure (i.e., two messages versus four messages). In the two-step random access procedure, the UE may transmit to the base station a single random access message (e.g., MsgA). In response to the random access message, the base station may transmit to the UE a single response message, such as a random access response message (e.g., MsgB).

As compared to the four messages of a four-step random access procedure, for example, the random access message (e.g., MsgA) of the two-step random access procedure may combine all or a portion of the Msg1 and the Msg3 of a four-step random access procedure (and in some cases may include additional random access information). The UE may transmit the random access message to the base station on, for example, a physical random access channel (PRACH), a physical uplink shared channel (PUSCH), or using other configured resources. The random access message may include a preamble and a data payload. In the two-step random access procedure, if the base station successfully receives the random access message, the base station may transmit a random access response message (e.g., MsgB) to the UE. As compared to the four messages of a four-step random access procedure, for example, the random access response message of the two-step random access procedure may combine all or a portion of the Msg2 and the Msg4 of the four-step random access procedure (and in some cases may include additional random access information). For example, the random access response message may include an acknowledgement that the random access response message was successfully received and decoded, a scheduling grant indicating a set of resources for the UE to use to transmit a further data transmission, a network identifier (e.g., a cell radio network temporary identifier (C-RNTI)) for subsequent communication with the UE, and like information. The random access response message may indicate to the UE that the base station successfully received all or a portion of the random access message.

If, however, the base station does not detect the random access preamble, or the LBT procedure is unsuccessful, the base station may not transmit the random access response message (and the random access procedure may fail, the UE may not establish a connection to the base station, etc.). According to the techniques described herein, to improve execution and efficiency of random access message (e.g., MsgA) transmissions in various scenarios, cyclic prefix orthogonal frequency division multiplexing (CP-OFDM) waveforms and/or discrete Fourier transform spread orthogonal frequency division multiplexing (DFT-s-OFDM) waveforms may be supported for such random access message (e.g., MsgA) transmissions. For example, implementation of CP-OFDM waveforms and DFT-s-OFDM waveforms may accommodate differences in UE radio resource control (RRC) states, cell sizes, UE capabilities, etc., and each waveform may provide certain advantages over one another in various communications scenarios. For example, DFT-s-OFDM waveforms may provide improved robustness against timing inaccuracies, and CP-OFDM waveforms may provide for decreased reception complexity (e.g., at a receiving base station).

As such, the techniques described herein may provide for waveform configuration for autonomous uplink transmission (e.g., such as random access messages of two-step random access procedures). The described techniques relate to improved methods, systems, devices, and apparatuses that support waveform configuration and indication for uplink transmission. Generally, the described techniques may provide for flexible waveform configuration for autonomous uplink transmissions. For example, in a two-step random access procedure, a UE may autonomously (e.g., grant-free, contention-based) transmit an initial random access message (e.g., such as a MsgA, which may include a random access preamble and a random access payload) to a base station according to a waveform configuration.

In some cases, the UE may acquire random access configuration information (e.g., waveform configuration information) for a random access procedure from one or more broadcast transmissions of the base station. For example, the UE may receive a synchronization signal block (SSB) that may provide synchronization signals (e.g., a primary synchronization signal (PSS) and a secondary synchronization signal (SSS)) and a physical broadcast (PBCH) transmission that identifies a control resource set (CORESET) to be monitored to identify resources that contain remaining minimum system information (RMSI). In some cases, the UE may receive one or more system information blocks (SIBs) from the base station, one or more reference signals (RSs) (e.g., a cell-specific reference signal (CRS)) from the base station, or combinations thereof, that may be used to identify the random access configuration. Such SSB, SIB, and RS transmissions may be used to identify random access resources, whether a two-step random access procedure is enabled, a preamble length for the random access preamble, transmission parameters for the random access preamble and random access payload, other configuration parameters, or any combinations thereof.

A base station may transmit broadcast signaling (e.g., a SIB1) indicating a waveform configuration associated with some set of supported waveform types for an autonomous uplink transmission by a UE. In some cases, the broadcast signaling may include a waveform configuration field (WCF) that may convey waveform configuration information. The WCF may indicate whether flexible waveforms for autonomous uplink are supported, may explicitly configure a waveform type, may indicate waveform configuration mapping rules, etc. In some cases, one or more look up tables (LUTs) may include waveform configuration information, and the WCF may indicate whether flexible waveforms for autonomous uplink are supported and may implicitly configure a waveform type (e.g., via referencing a LUT, or by being aware of one or more LUTs maintained by the UE).

As such, a UE may determine a waveform configuration (e.g., a waveform type to use for an autonomous uplink transmission) based on the received signaling (e.g., waveform configuration information) from the base station. For example, a UE may identify waveform configuration information from a WCF, may determine an autonomous uplink scenario, or both, to determine a waveform configuration for an autonomous uplink transmission. As used herein, an autonomous uplink scenario may refer to channel parameters determined from performed channel measurements, a RRC state of the UE, a capability tier of the UE associated with an autonomous uplink transmission, a cell size associated with the received broadcast signaling, a position of the UE within the cell determined from positioning measurements, etc. In some cases, waveforms for autonomous uplink transmission may be configured based on autonomous uplink transmission parameters used by the UE. As used herein, autonomous uplink transmission parameters may refer to a modulation coding scheme (MCS), a preamble sequence, a demodulation reference signal (DMRS) sequence, time resources, frequency resources, a payload size, etc. used by the UE for an autonomous uplink transmission.

For example, a UE may identify a WCF in a SIB1, may determine that flexible waveforms for autonomous uplink are supported, and may identify waveform configurations for autonomous uplink transmissions from the WCF. In other examples, a UE may identify a WCF, may determine that flexible waveforms for autonomous uplink are supported, and may reference a LUT based on an autonomous uplink transmission scenario at the UE and/or based on autonomous uplink transmission parameters (e.g., as waveform configurations may be specified by the network for various autonomous uplink transmission scenarios and/or autonomous uplink transmission parameters). In yet other examples, a UE may identify a WCF, may determine that flexible waveforms for autonomous uplink are supported, and may identify waveform configuration/scenario mapping information from WCF (and may determine a waveform configuration based on the waveform configuration/scenario mapping information and the identified autonomous uplink scenario and/or autonomous uplink transmission parameters).

That is, in some cases, a UE may identify a mapping between one or more scenarios determined at the UE (e.g., autonomous uplink scenarios) and one or more corresponding waveform types (e.g., CP-OFDM waveform type or DFT-s-OFDM waveform type) of the plurality of supported waveform types, and the waveform type for transmitting an autonomous uplink transmission may be determined based on the mapping. In some cases, the mapping between the one or more scenarios determined at the UE and the one or more corresponding waveform types may be based on received broadcast signaling (e.g., a SIB1 or other configuration information), additional broadcast signaling, radio resource control signaling, or a combination thereof. Further, the UE may determine a scenario at the UE (e.g., an autonomous uplink scenario), where the waveform type for transmitting an autonomous uplink transmission may be determined based on the scenario at the UE. As discussed herein, the scenario may include or refer to downlink channel measurements performed by the UE, positioning measurements, a timing offset value, a radio resource control state of the UE, a capability tier of the UE, a cell size associated with the received broadcast signaling, etc. In some cases, the waveform configuration may be determined based on transmission parameters to be used by the UE for an autonomous uplink transmission. For example, the UE may determine a waveform configuration based on an MCS, preamble/DMRS sequence, time/frequency resources, etc., that are to be used for an autonomous uplink transmission.

As discussed herein, the waveform configuration may be determined based on the transmission parameters and a mapping between the transmission parameters and a waveform type. In some cases, the scenarios and the waveform type mapping for one or more of the scenarios may be included in a LUT, may be indicated in a WCF, may be indicated by other base station signaling (e.g., RRC signaling, other broadcast information), etc. As such, the UE may identify whether flexible waveform configuration for autonomous uplink is supported, and may determine waveform types (e.g., CP-OFDM or DFT-s-OFDM) for autonomous uplink transmissions based on explicit waveform type configuration from a base station (which may include an indication of whether flexible waveform configuration is supported, an indication of waveform type/scenario mapping rules, etc.), one or more LUTs, identified autonomous uplink scenarios, autonomous uplink transmission parameters, or some combination thereof.

After successfully performing the random access procedure, the UE and the base station may establish a data connection to communicate subsequent transmissions of data and other communications. That is, the UE and the base station may establish a RRC configuration for the data connection, and the base station may allocate resources (e.g., time, frequency, and/or spatial resources) for uplink control transmissions such as scheduling requests. After the random access procedure, the UE may be in a connected state with the base station.

A UE using techniques in accordance with various aspects of the present disclosure may thus transmit messages in a two-step random access procedure using flexible waveform configurations. The base station may efficiently receive the random access messages under various autonomous uplink scenarios and may complete the two-step random access procedure and send a response message to the UE. Such two-step random access procedures may provide enhanced efficiency and reduced overhead relative to a four-step random access procedure that may be used in some cases. Further, techniques as discussed herein may allow for efficient determination of the transmission waveform to be used for a preamble and payload transmission, to provide such transmission waveform flexibility for dynamic waveform selection according to various scenarios.

Aspects of the disclosure are initially described in the context of a wireless communications system. Aspects of the disclosure are further illustrated by and described with reference to example random access message formats and example process flows. Aspects of the disclosure are further illustrated by and described with reference to apparatus diagrams, system diagrams, and flowcharts that relate to waveform configuration and indication for uplink transmission.

FIG. 1 illustrates an example of a wireless communications system 100 that supports waveform configuration and indication for uplink transmission in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM), CP-OFDM, DFT-S-OFDM, etc.).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHZ). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize one or more carriers that have a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing such carriers may transmit wideband signals (e.g., according to frequency channel or carrier bandwidths of 20, 40, 60, 80 MHz, etc.) at reduced symbol durations (e.g., 16.67 microseconds). A TTI in such cases may include one or multiple symbol periods. In some cases, the TTI duration (that is, the number of symbol periods in a TTI) may be variable.

A UE 115 may perform a random access procedure (e.g., a RACH procedure) with a base station 105 to access a wireless network (e.g., wireless communications system 100), for example, when initially accessing the wireless network or during a handover procedure. In some cases, a random access procedure may be performed as a four-step random access procedure. The four-step random access procedure may, for example, include a random access request message, a random access response message, a radio resource control (RRC) message, and/or a contention resolution message. In some cases, these messages may include, or be referred to as, Msg1, Msg2, Msg3, and Msg4, respectively. Each of the messages of the four-step random access procedure may be communicated using corresponding sets of resources (e.g., corresponding sets of time, frequency, and/or spatial resources).

According to the four-step random access procedure, the UE 115 may transmit to the base station 105 a first message (e.g., Msg1), for example, a random access request message.

In response, the base station 105 may transmit to the UE 115 a second message (e.g., Msg2). The second message may include a grant of uplink resources for the UE 115 to transmit, to the base station 105, a third message such as, for example, an RRC message (e.g., Msg3) requesting a new or reconfigured connection with the base station 105. In some cases, the four-step random access procedure may include the base station 105 transmitting, to the UE 115, a fourth message such as, for example, a contention resolution message (e.g., Msg4), or other downlink signaling, such as an RRC message, to confirm the requested new or reconfigured connection. After successfully performing the random access procedure, the UE 115 and the base station 105 may establish a data connection to communicate subsequent transmissions of data and other communications. That is, the UE 115 and the base station 105 may establish an RRC configuration for the data connection, and the base station 105 may allocate resources (e.g., time, frequency, and/or spatial resources) for uplink control transmissions such as scheduling requests. After the random access procedure, the UE 115 may be in a connected state with the base station 105.

In some cases, the UE 115 and the base station 105 may perform the four-step random access procedure while operating in a shared or unlicensed radio frequency spectrum bandwidth. In some cases, other communications devices (e.g., other UEs 115, base stations 105, etc.) in the relatively nearby vicinity may also send transmissions using resources of the shared radio frequency spectrum bandwidth (the resources, for example, at least partially overlapping a set of resources to be used for the four-step random access procedure). In such cases, communications to and/or from the other devices on overlapping time, frequency, and space resources of the shared radio frequency spectrum band may collide with the messages communicated between the UE 115 and the base station 105 for the four-step random access procedure.

In some cases, if one message of the random access procedure is not correctly received, the random access procedure may fail (e.g., due to the deterministic relationship, and timings for, one message to the next in the random access procedure). For example, if the random access response message collides with another transmission from another device in the vicinity of the UE 115 or the base station 105 (the other device transmitting using the same or an overlapping set of resources), the UE 115 may not correctly receive the random access response message including the grant for the first set of uplink resources on which to transmit the RRC message to the base station 105. In this case, the random access procedure fails, and the UE 115 and the base station 105 may restart a new random access procedure, for example, from the first message (e.g., via a new random access request message). In this way, for example, one message collision may cause a failure to successfully complete a random access procedure including one uplink grant in the random access response message, which may result in inefficient resource utilization and/or communications delays (e.g., a delay in obtaining access to a network).

In some cases, before establishing a connection for communications on the shared radio frequency spectrum band, the UE 115 and/or the base station 105 may utilize a channel access procedure (e.g., an LBT procedure) to determine whether the time and frequency resources for the channel are available, which may prevent interference and collisions with another random access message, multi-user interference, another UE and another base station, higher priority transmissions (e.g., radar), and the like. For example, before one or more of the messages of a random access procedure, the UE 115 and/or the base station 105 may perform an LBT procedure to contend for access to the shared radio frequency spectrum band.

In some cases, alternatively to a four-step random access procedures, the UE 115 may be configured to perform a two-step random access procedure. For example, the UE 115 may use the two-step random access procedure when an amount of data to be transferred is below a threshold amount of data. In a two-step random access procedure the UE 115 and the base station 105 may exchange relatively fewer messages than in a four-step random access procedure (i.e., two messages versus four messages). In the two-step random access procedure, the UE 115 may transmit, to the base station 105, a single random access message (e.g., MsgA). In response to the random access message, the base station 105 may transmit, to the UE 115, a single response message, such as a random access response message (e.g., MsgB).

As compared to the four messages of a four-step random access procedure, for example, the random access message of the two-step random access procedure may combine all or a portion of the Msg1 and the Msg3 of a four-step random access procedure. The UE 115 may transmit the random access message to the base station on, for example, a physical random access channel (PRACH), a PUSCH, or using other configured resources. The random access message may include a preamble and a data payload. In some cases, the UE 115 may transmit the preamble and the data payload using different numerologies (i.e., different transmission waveform characteristics, such as subcarrier spacing, cyclic prefix size, etc.), different sets of transmission resources (e.g., time, frequency, and/or spatial resources), different portions of a carrier, different bandwidth parts, using different power control schemes (e.g., using different transmit powers), and/or different sampling rates.

In the two-step random access procedure, before transmitting the preamble of the random access message, the UE 115 may perform an LBT procedure to ascertain that a set of resources is available for transmission (e.g., a set of time, frequency, and/or spatial resources). If the LBT procedure is successful, the UE 115 may transmit the preamble of the random access message to the base station 105. The set of resources for which the UE 115 performed the LBT procedure may be a different set of resources than the set of resources with which the UE 115 is to transmit the data payload. Additionally, the set of resources used to transmit the preamble may be associated with a different numerology (e.g., a different subcarrier spacing) than the set of resources used to transmit the data payload. Thus, in some cases (e.g., after transmitting the preamble), the UE 115 may perform a second LBT procedure during a tuning gap to ascertain that the set of resources for transmitting the data payload is available for transmission.

In the two-step random access procedure, if the base station 105 successfully receives the random access message, the base station 105 may also perform an LBT procedure for transmitting, to the UE 115, the random access response message of the two-step random access procedure. As compared to the four messages of a four-step random access procedure, for example, the random access response message of the two-step random access procedure may combine all or a portion of the Msg2 and the Msg4 of the four-step random access procedure. If the LBT procedure is successful, the base station 105 may transmit the random access response message to the UE 115 using, for example, a PDCCH and/or a PDSCH. For example, the base station 105 may transmit control information using the PDCCH including a grant for the PDSCH, and the PDSCH payload may include data of the random access response message. For example, the random access response message may include an acknowledgement that the random access response message was successfully received and decoded, a scheduling grant indicating a set of resources for the UE 115 to use to transmit a further data transmission, a network identifier (e.g., a cell radio network temporary identifier (C-RNTI)) for subsequent communication with the UE 115, and like information. The random access response message may indicate to the UE 115 that the base station 105 successfully received all or a portion of the random access message. If, however, the base station 105 does not detect the random access preamble, or the LBT procedure is unsuccessful, the base station 105 may not transmit the random access response message.

After successfully performing the random access procedure, the UE 115 and the base station 105 may, or may not, establish a data connection for subsequent transmissions of data and other communications. Accordingly, in the two-step random access procedure, relative to the four-step random access procedure, the UE 115 may be capable of transmitting data (such as the data payload) to the base station 105 without transitioning to a connected state for data transmission. Accordingly, a successful two-step random access procedure may provide, for example, relatively improved latency and faster connection speeds than a successful four-step random access procedure, especially in the case of relatively small data payloads or intermittent data.

According to the techniques described herein, wireless communications system 110 may support flexible waveform configuration for autonomous uplink transmissions. A base station 105 may transmit broadcast signaling (e.g., a SIB) indicating waveform configuration information for an autonomous uplink transmission by a UE 115. In some cases, the broadcast signaling may include a WCF that may indicate whether flexible waveforms for autonomous uplink are supported, may configure a waveform type, may indicate waveform configuration mapping rules, etc. As such, a UE 115 may identify whether flexible waveform configuration for autonomous uplink is supported, and may determine waveform types for autonomous uplink transmissions based on waveform type configuration information from a base station 105 (e.g., which may include an indication of whether flexible waveform configuration is supported, an indication of waveform type/scenario mapping rules, etc.), one or more LUTs, identified autonomous uplink scenarios, autonomous uplink transmission parameters, or some combination thereof.

Figure 2:
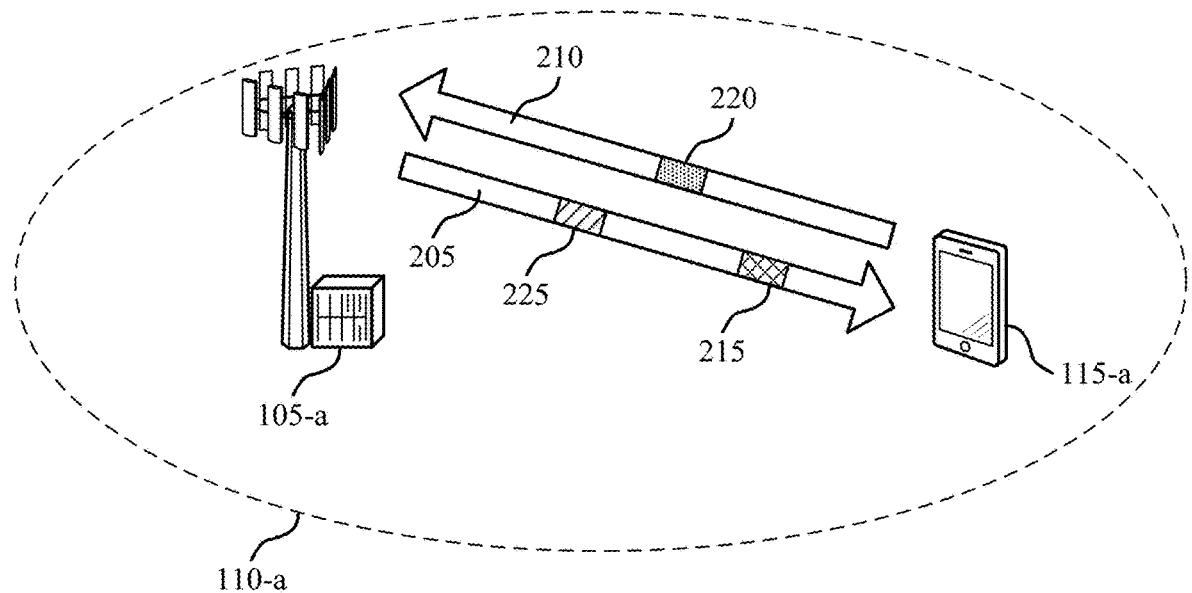
FIG. 2 illustrates an example of a wireless communications system that supports waveform configuration and indication for uplink transmission in accordance with aspects of the present disclosure.

FIG. 2 illustrates an example of a wireless communications system 200 that supports waveform configuration and indication for uplink transmission in accordance with aspects of the present disclosure. In some examples, wireless communications system 200 may implement aspects of wireless communications system 100. The wireless communications system 200 includes a base station 105-a and a UE 115-a, which may be examples of the corresponding devices as described with reference to FIG. 1.

In some cases, the UE 115-a may perform a connection procedure (e.g., a random access procedure, such as a RACH procedure) to establish a connection with the base station 105-a. For example, the UE 115-a may perform a random access procedure, such as a two-step and/or a four-step random access procedure (e.g., a two-step RACH procedure and/or a four-step RACH procedure), to establish a connection to be used to communicate using uplink transmissions 210 and downlink transmissions 205. In some cases, the base station 105-a may transmit configuration information 215 that may be received by the UE 115-a, and other UEs, that may provide configuration information for random access procedures available at the base station 105-a, one or more parameters associated with the random access procedures (e.g., a preamble length, transmission power, etc.), wireless resources for random access message transmissions (e.g., time, frequency, and/or spatial resources, RO windows, etc.), etc.

In some cases, the UE 115-a may determine (e.g., based on the configuration information 215, an RRC state, a cell size, UE capabilities, a path loss metric, etc.), to perform a two-step random access procedure, and may transmit an initial random access message 220 to the base station 105-a. The initial random access message 220, which may be a MsgA transmission of a two-step RACH procedure, may include a random access preamble and a random access payload. The base station 105-a may receive the initial random access message 220 and perform processing on the message to determine a random access response 225, which may be a MsgB transmission of a two-step RACH procedure, that may be transmitted to the UE 115-a to complete the random access procedure.

As compared to four messages of a four-step random access procedure, for example, the random access message 220 of the two-step random access procedure may combine all or a portion of the Msg1 and the Msg3 of a four-step random access procedure. The UE 115-a may transmit the random access message 220 to the base station 105-a, for example, on a PRACH, a PUSCH, or using other configured resources (e.g., identified via configuration information 215). In some cases, the UE 115-a may transmit the preamble and the data payload (e.g., of the random access message 220, which in some cases may be referred to as a MsgA) using different numerologics (i.e., different transmission waveform characteristics, such as subcarrier spacing, cyclic prefix size, etc.), different sets of transmission resources (e.g., time, frequency, and/or spatial resources), different portions of a carrier, different bandwidth parts, using different power control schemes (e.g., using different transmit powers), and/or different sampling rates, and/or different beam configurations for UE transmitting and base station receiving.

In some cases, the preamble (in some cases referred to a RACH preamble, or PRACH preamble) may be a sequence from a group of predefined sequences. The preamble may indicate to the base station 105-a the presence of a random access attempt and allow the base station 105-a to determine a delay (such as a timing delay) between the base station 105-a and the UE 115-a. The preamble of the random access message 220 may, in some cases, be defined by a preamble sequence and a cyclic prefix. A preamble sequence may be defined based in part on a Zadoff-Chu sequence. The UE 115-a may, in some cases, use a guard period to handle timing uncertainty of the random access message 220 transmission. For example, before beginning the random access procedure, the UE 115-a may obtain downlink synchronization with the base station 105-a based in part on a cell-search procedure. However, because the UE 115-a has not yet obtained uplink synchronization with the base station 105-a, there may be an uncertainty in uplink timing due to the location of the UE 115-a in the cell (such as geographic coverage area of base station 105-a) not being known. In some cases, the uncertainty in uplink timing may be based in part on a dimension (e.g., size and/or area) of the cell. In some cases, the UE 115-a may also transmit one or more reference signals with the payload, for example, to be used for demodulation (e.g., a DMRS), or other like purposes.

In some cases, after successfully performing the random access procedure, the UE 115-a and the base station 105-a may establish a data connection to communicate subsequent transmissions of data and other communications. For example, the UE 115-a and the base station 105-a may establish an RRC configuration (e.g., context) for the data connection, and the base station 105-a may allocate resources (e.g., PUCCH resources) for uplink control transmissions such as scheduling requests, channel state information (CSI) reporting, or acknowledgements. After the random access procedure, the UE 115-a may be in a connected state (e.g., RRC connected state) with the base station 105-a.

In some cases, the UE 115-a and the base station 105-a may operate in a shared or unlicensed radio frequency spectrum bandwidth. In some such cases, before establishing and initiating communications (e.g., prior to transmissions during a random access procedure), the UE 115-a and/or the base station 105-a may utilize a channel access procedure to determine whether the time and frequency resources for the channel are available, which may prevent interference and collisions with communications between other UEs 115 and the base station 105-a, between the UE 115-a and another base station 105, higher priority transmissions (e.g., radar), and the like. For example, before one or more (e.g., each) of the messages of the random access procedure, the UE 115-a and/or the base station 105-a may perform an opportunistic contention-based channel access procedure (e.g., a LBT procedure, such as a CAT4, CAT2, or CAT1 LBT procedure, etc.) to contend for access to the transmission medium or channel. In some cases, the UE 115-a may perform a directional LBT procedure in multiple transmission directions, for example, for communications systems using directional communications (e.g., mmW communications systems).

For example, before transmitting the preamble of the random access message 220, the UE 115-a may perform an LBT procedure to ascertain that a set of resources is available for transmission (e.g., a set of time, frequency, and/or spatial resources). If the LBT procedure is successful, the UE 115-a may transmit the preamble of the random access message 220 to the base station 105-a. Similarly, if the base station 105-a successfully receives the random access message 220, the base station 105-a may also perform an LBT procedure for transmitting to the UE 115-a the random access response 225 of the two-step random access procedure.

In some cases, both CP-OFDM waveforms and DFT-s-OFDM waveforms may be supported for grant-free and contention-based transmissions (e.g., such as for random access message 220 transmissions, which may be referred to as MsgA transmissions). CP-OFDM waveforms and DFT-s-OFDM waveforms may accommodate differences in RRC states, cell size, UE capabilities, etc. For example, depending on the RRC state (e.g., whether the UE 115-a is in a RRC connected state, an RRC idle state, an RRC inactive state, etc.), the timing/frequency offsets for uplink transmissions may be different. DFT-s-OFDM waveforms may provide preferred robustness against timing inaccuracies, and CP-OFDM waveforms may provide for reduced receiver complexity at a receiving device. As such, for example, a UE 115-a in an RRC idle state may be associated with a relatively large timing/frequency offset from base station 105-a, and may thus use DFT-s-OFDM waveforms for autonomous uplink transmissions (e.g., for random access message 220 transmissions).

In other examples, a CP-OFDM waveform or a DFT-s-OFDM waveform may be selected based on cell size. In a large cell, cell-edge UEs may suffer from larger pathloss and may favor low peak-to-average power ratio (PAPR) for better power amplifier (PA) efficiency. If UE 115-a is in or near the relative center of the cell, the UE 115-a may use CP-OFDM waveforms for autonomous uplink transmissions (e.g., to reduce reception complexity at the receiving base station 105-a). In some cases, if a UE 115-a is near the relative edge of the cell, the UE 115-a may use DFT-s-OFDM waveforms for autonomous uplink transmissions (in some cases, DFT-s-OFDM waveforms may be more robust to pathloss). In yet other examples, a CP-OFDM waveform or a DFT-s-OFDM waveform may be selected based on capabilities of the UE. For example, low tier UEs and premium UEs may be subject to different constraints in TX power, bandwidth and other RF capabilities (premium UEs may be capable of using more bandwidth than low tier UEs). In some cases, low tier UEs, or UEs with relatively less capabilities compared to other UEs (which may be referred to as premium UEs), may use DFT-s-OFDM waveforms for autonomous uplink transmissions.

The techniques described herein may provide for efficient waveform configuration for autonomous uplink transmissions (e.g., CP-OFDM waveform and DFT-s-OFDM waveform configuration for random access message 220 transmissions by UEs 115 operating in different RRC states, UEs 115 in different cell sizes, UEs 115 with different capabilities, etc.). For example, as discussed herein, a UE 115 may be configured to use CP-OFDM waveforms and/or DFT-s-OFDM waveforms, under various scenarios, for autonomous uplink transmissions.

In some examples, base station 105-a may support (and, in some cases, configure) different waveform types (e.g., CP-OFDM waveforms and/or DFT-s-OFDM waveforms) for autonomous uplink transmissions (e.g., MsgA payload transmissions) depending on channel measurements, UE capabilities, downlink pathloss measurements, positioning measurements, etc. For example, downlink pathloss measurements may be performed by a UE 115 based on a synchronization signal block (SSB), system information block (SIB), configuration information 215, or other signals transmitted by a base station 105. Positioning measurements (e.g., reference signal time difference (RSTD) measurements, observed time difference of arrival (OTDOA) measurements, round trip time (RTT) measurements, etc.) may be performed by a UE 115 and/or a base station 105 (e.g., based on SSB, SIB, positioning reference signal (PRS), sounding reference signal (SRS), etc.).

For example, UEs that may be associated with a large pathloss scenario, UEs that may be associated with a large timing offset (e.g., from a base station 105), low tier UEs, etc. may be configured with DFT-s-OFDM waveforms for autonomous uplink transmissions. UEs associated with a small cell, premium UEs, etc., may be configured with CP-OFDM waveforms for autonomous uplink transmissions (e.g., when CP-ORDM waveforms are sufficient, CP-ORDM waveforms may offer lower receiver complexity for a receiving base station). In general, an autonomous uplink (e.g., a MsgA) waveform scenario mapping rule (e.g., a mapping between waveform configurations for autonomous uplink and various scenarios or UE conditions) may be established within a wireless communications system (e.g., within wireless communications system 200).

In some examples, waveform scenario mapping rules (e.g., various waveform configurations based on UE 115 capabilities, UE 115 measurements, etc.) may be indicated by configuration information 215, other system information (SI), RRC signaling, paging information, etc. In some cases, a waveform configuration field (WCF) may be included in configuration information 215, and may indicate waveform scenario mapping rules. For example, a WCF may be included in (or added to) SIB1 for two-step RACH, to indicate under which MsgA scenarios (e.g., RRC state, UE capability, etc.) flexible waveform configuration may be triggered. In some cases, a WCF may further indicate waveform configurations based on UE 115 capabilities, UE 115 measurements, etc.

In some examples, waveform configurations for different scenarios may be established in preconfigured look up tables (LUTs) maintained by a base station 105 and a UE 115. For example, waveform configurations may be coupled with resource configurations in the time domain, frequency domain, and code domain. Due to correlations among payload size, modulation coding scheme (MCS), and RRC state, waveform configurations may be coupled with the setting of MCS, payload size, and/or resource allocation for autonomous uplink transmissions (e.g., MsgA transmissions of a two-step RACH procedure). For example, a UE in a RRC idle state may transmit MsgA with a smaller payload, and a UE in a RRC connected state may transmit MsgA with larger payloads. For a large cell, multi-slot repetition for better coverage can also be enabled and specified as MCS enhancement for two-step RACH.

Such coupling relationships (e.g., relationships or correlations among autonomous uplink payload size, MCS, and UE RRC state) may be summarized/compressed into one or multiple LUTs (which may be preconfigured or specified by a network or a wireless communications system, and may be maintained and adhered to by UEs and the base station). As configurable resources in code domain, the preamble and/or DMRS sequences may become parameters of the LUT as well (waveform configurations may be mapped to preamble and/or DMRS sequences used for autonomous uplink transmissions). Depending on the deployment and use cases (e.g., RRC request with UE-ID, or user plane (UP)/control plane (CP) data, or uplink control information (UCI)), a base station may indicate to UE (e.g., via SI or RRC) which LUT(s) will be used for MsgA transmission. A UE may then select the resources (e.g., transmission occasions in time-frequency grid, preamble/DMRS sequences) for an autonomous uplink transmission (e.g., a MsgA transmission of a two-step random access procedure) and may identify a waveform configuration based on the selected resources and the one or more LUTs. A base station may detect or identify the waveform type used MsgA based on its resource configurations in time/frequency/code domains (e.g., based on time-frequency grid, preamble/DMRS sequences, etc. of the MsgA transmission and referencing the one or more LUTs to identify which waveform type was used).

In some examples, a single waveform type indication may be implemented by a network. In some cases, depending on uplink coverage requirements, a base station may decide whether DFT-s-OFDM or CP-OFDM waveform will be used for MsgA payload transmission, regardless of the payload size. The base station 105 may indicate the waveform type in the RACH configuration field of SIB1. Such may be backward compatible with four-step RACH, without introducing additional signaling overhead.

According to the techniques described herein, a UE 115-a may thus be configured with various waveform types (e.g., DFT-s-OFDM waveforms or CP-OFDM waveforms, depending on the UE RRC state, the UE capabilities, channel measurements, downlink pathloss measurements, positioning measurements, the MCS, payload size, and/or resource allocation of an autonomous uplink transmission, etc.). A UE 115-a may receive signaling indicating a waveform configuration associated with a set of supported waveform types for an autonomous uplink transmission. For example, a UE 115-a may receive waveform configuration information for autonomous uplink transmission (such as, for example, the information in example Tables 1-4, or the like) via broadcast signaling, RRC signaling, SIB, etc. In some cases, the UE 115-a may receive waveform configuration information in the form of an indication of one or more autonomous uplink waveform configuration LUTs. The UE 115-a may then determine a waveform type of the set of supported waveform types for transmitting the autonomous uplink transmission (e.g., based on the waveform configuration and the UE RRC state, the UE capabilities, channel measurements, downlink pathloss measurements, positioning measurements, etc.) and transmit the autonomous uplink transmission according to the determined waveform type.

Figure 3:
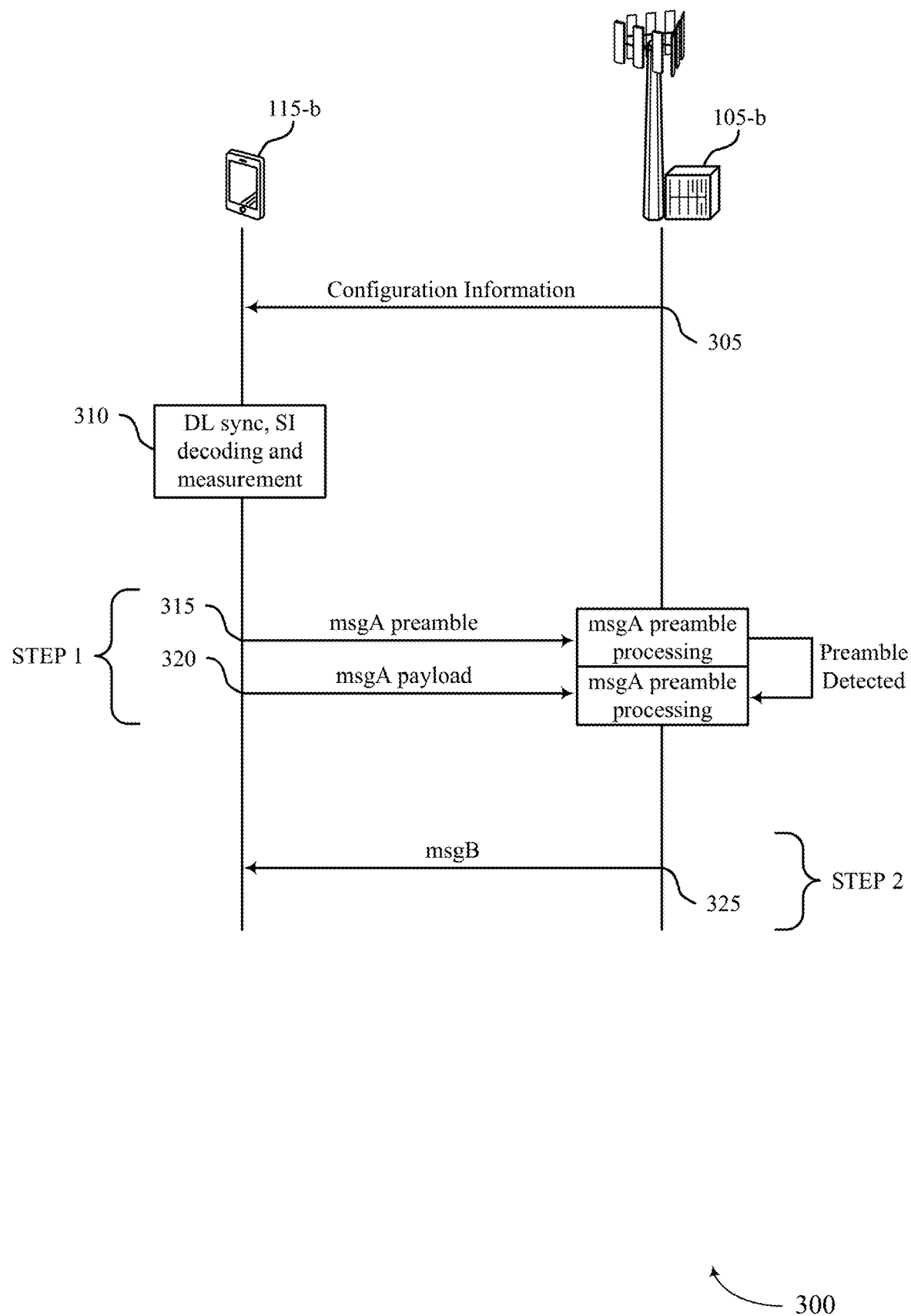
FIG. 3 illustrates an example of a process flow that supports waveform configuration and indication for uplink transmission in accordance with aspects of the present disclosure.

FIG. 3 illustrates an example of a process flow 300 that supports waveform configuration and indication for uplink transmission in accordance with aspects of the present disclosure. In some examples, process flow 300 may implement aspects of wireless communications system 100 or wireless communications system 200. Further, process flow 300 may be implemented by a UE 115-b and a base station 105-b, which may be examples of a UE 115 and a base station 105 described with reference to FIGS. 1-2. In the following description of the process flow 300, the operations between UE 115-b and base station 105-b may be transmitted in a different order than the order shown, or the operations performed by base station 105-b and UE 115-b may be performed in different orders or at different times. Certain operations may also be left out of the process flow 300, or other operations may be added to the process flow 300. It is to be understood that while base station 105-b and UE 115-b are shown performing a number of the operations of process flow 300, any wireless device may perform the operations shown.

At 305, base station 105-b may transmit configuration information to UE 115-b. In some cases, the configuration information may configure a two-step random access procedure and configure random access resources for random access procedures. In some cases, random access resources may be configured based on a preamble length, transmission channel characteristics, channel bandwidth, numerology for the preamble, payload, or both, one or more other factors, or any combinations thereof. For example, in some cases, the configuration information may indicate a waveform configuration associated with a set of supported waveform types for an autonomous uplink transmission (e.g., for a random access message of a random access procedure). In some cases, the configuration information may refer to broadcast signaling, RRC signaling, a SIB, SI, or some combination thereof. In some cases, the configuration information may be conveyed over one or more transmissions from the base station 105-b.

At 310, UE 115-b may perform downlink synchronization procedures, SI decoding procedures, measurement procedures, etc.

At 315, UE 115-b may transmit a random access preamble and, at 320, may transmit a random access payload. In some cases, the random access preamble and the random access payload may be transmitted as a single transmission, and may collectively be referred to as a random access message, step 1 of a two-step random access procedure, a MsgA, etc. For example, a MsgA preamble and a MsgA payload may be transmitted back to back as a TDM bundle. At 315, base station 105-b may perform a preamble detection procedure and identify the random access preamble of the UE 115-b. Based on the detected preamble, the base station 105-b may, at 320, perform payload decoding. In some cases, the base station 105-b may decode the random access payload of the UE 115-b and identify the uplink control information provided by the UE 115-b. In some cases, the payload may include a DMRS, which may be used by the base station 105-b to assist in the demodulation and decoding of the payload. In some cases, MsgA may generally refer to a random access message, and may be transmitted via a physical random access channel (PRACH) or a DMRS/PUSCH. The MsgA may include a RRC request (e.g., a Msg3 equivalent of a four-step random access procedure), small data from UP/CP, UCI, etc.

At 325, base station 105-b may format a random access response (e.g., a MsgB, step 2 of a two-step random access procedure, etc.), and may transmit the random access response to the UE 115-b. The random access response may be determined based on the payload received from the UE 115-b in accordance with a second step of the two-step random access procedure. The MsgB may generally refer to a random access response, and may be transmitted via a DMRS/PDCCH or a DMRS/PUSCH. The MsgB may include, for example, equivalents of Msg2 and Msg4 of a four-step random access procedure. Following the random access response, the base station 105-b and UE 115-b may, for example, initiate a RRC connection establishment procedure, a RRC re-establishment procedure, a handover procedure, a timing synchronization procedure, or any combinations thereof. In some cases, if the MsgA is not received, or not properly detected, by the base station 105-b, the base station 105-b may not transmit the MsgB.

Figure 4:
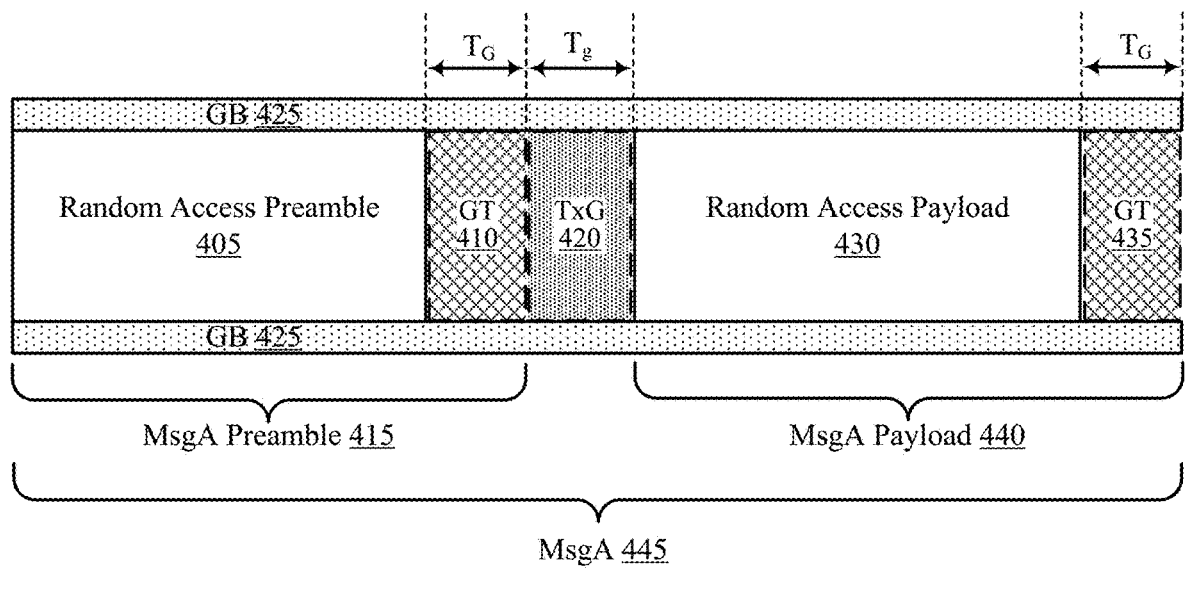
FIG. 4 illustrates an example of a random access message that supports waveform configuration and indication for uplink transmission in accordance with aspects of the present disclosure.

FIG. 4 illustrates an example of a random access message 400 that supports waveform configuration and indication for uplink transmission in accordance with aspects of the present disclosure. In some examples, random access message 400 may implement aspects of wireless communications system 100 or wireless communications system 200. Additionally, random access message 400 may be used in conjunction with process flow 300 or process flow 700 of FIGS. 3 and 7. In this example, the random access message 400 may be an initial random access message of a two-step random access procedure (e.g., MsgA of a two-step RACH procedure).

The random access message 400 in this example, includes a random access preamble 405 and a guard time (GT) 410 (e.g., which may span some duration (TG)), which may form MsgA preamble 415. The random access message 400 also includes a transmission gap (TxG) 420 (which may span some duration (Tg)), and random access payload 430. In some cases, a DMRS may be included with random access payload 430 (e.g., prior to the random access payload 430). In this example, a guard time (GT) 435 may also be provided following the random access payload 430 (which may span some duration (Tc)). The random access payload 430 and guard time 435 may form MsgA payload 440 of the two-step random access procedure. In some cases, the MsgA 445 may be associated with guard band (GB) 425 frequency regions.

A UE may transmit MsgA in any RRC state (regardless of whether the UE has a valid timing advance (TA) or not). The inclusion of the guard time (e.g., GT 410 and GT 435) and the guard band (e.g., GB 425) may reduce inter symbol interference (ISI), inter carrier interference (ICI), etc., of an asynchronous transmission. In some cases, inclusion of the transmission gap (e.g., TxG 420) may be desirable for both the UE and the base station to reduce implementation complexity. For example, GT 410 and or TxG 420 may be set or utilized such that the base station may derive a timing offset of the random access payload 430 from the random access preamble 405 (such that the base station has time to process the random access preamble 405 prior to detecting and decoding the random access payload 430).

For example, the inclusion of the TxG 420 may allow for retuning of transmit circuitry at a transmitting UE, performance of a LBT procedure, or any combinations thereof. In some cases, the TxG 420 may be used when a TA is unknown or out of date, when a different numerology is used for the random access preamble 405 and the random access payload 430, when a different bandwidth is used for the random access preamble 405 and the random access payload 430, when a different transmission beam is used for the random access preamble 405 and the random access payload 430, when different power control schemes are used for the random access preamble 405 and the random access payload 430, when a different sampling rate is used for the random access preamble 405 and the random access payload 430, when a different transmitting and/or receiving beam is used for the random access preamble 405 and the random access payload 430, or any combinations thereof. Further, in some cases, when the GT 410 is non-zero, the TxG 420 may be reduced. The term "transmission gap" may be used to generally refer to the time gap between the random access preamble 405 and the random access payload 430, which may include GT 410.

The GT 410, and GT 435, may allow for completion of a transmission with sufficient time to avoid interference with a subsequent transmission when timing synchronization may not be established. In some cases, the duration of the GT 410 may be dependent upon a preamble length, preamble format, or any combinations thereof. For example, if the base station configures long-sequence based preambles (e.g., for LTE reframing, large cells, coverage enhancement, high speed deployments, etc.), the duration of the GT 410 may be relatively long compared to guard times provided for short-sequence based preambles. Further, in some cases, the guard time 410 may be zero.

Figure 5:
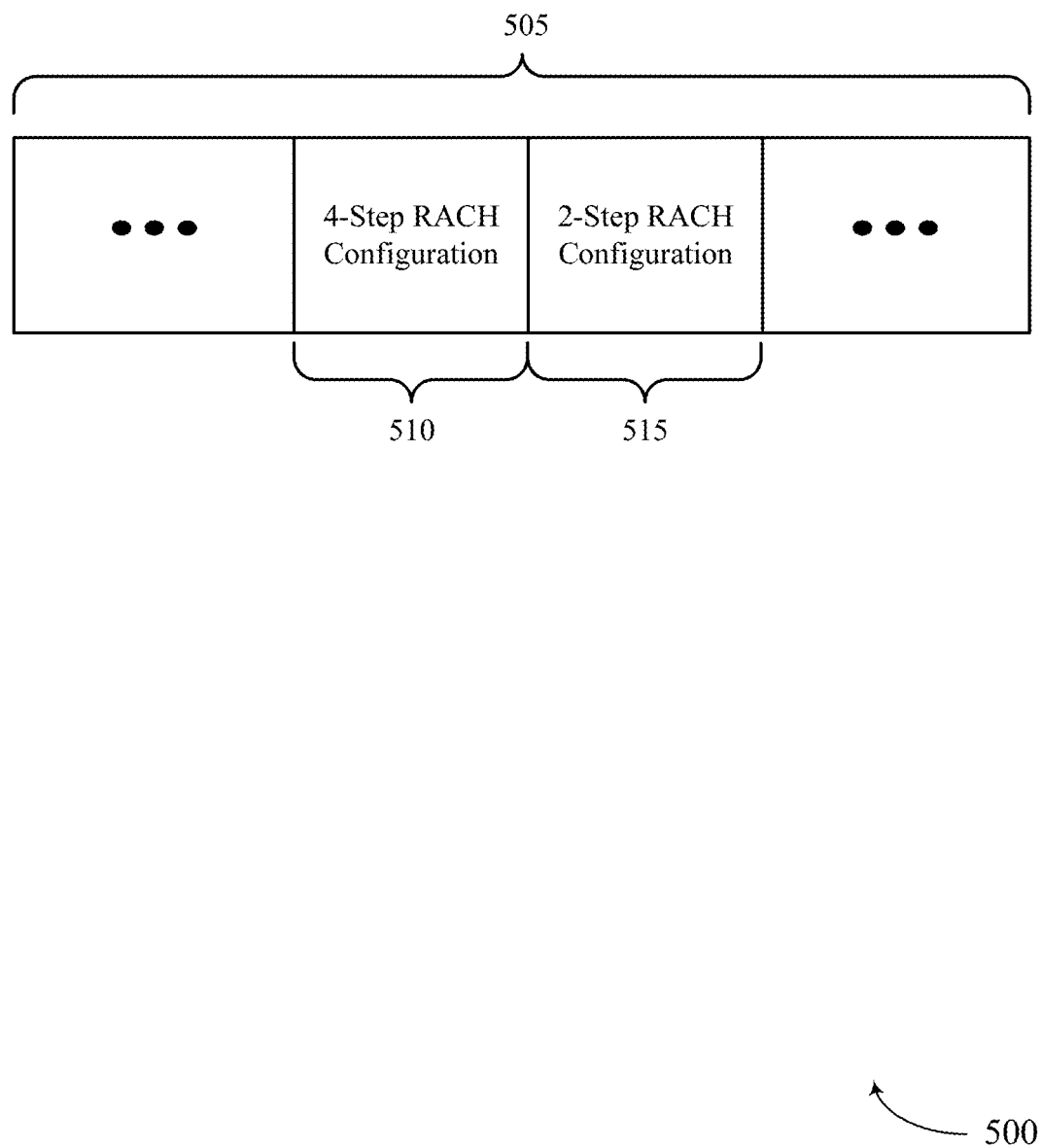
FIG. 5 illustrates an example of a configuration message that supports waveform configuration and indication for uplink transmission in accordance with aspects of the present disclosure.

FIG. 5 illustrates an example of a configuration message 500 that supports waveform configuration and indication for uplink transmission in accordance with aspects of the present disclosure. In some examples, configuration message 500 may implement aspects of wireless communications system 100 or wireless communications system 200. Additionally, configuration message 500 may be used in conjunction with process flow 300 or process flow 700 of FIGS. 3 and 7. In this example, the configuration message 500 may be a SIB.

Configuration message 500 may include a payload 505 (e.g., a SIB1 payload). In this example, the payload 505 may include information field 510 and information field 515. In some cases, information field 510 may include configuration information for a four-step random access procedure. For example, information field 510 may include a 1-bit waveform indication for Msg3, a RACH occasion (RO) configuration for Msg1 transmissions (e.g., by UEs), additional system information for four-step random access procedures, etc. In some cases, information field 515 may include configuration information for a two-step random access procedure. For example, information field 515 may include a WCF of MsgA, transmission occasion configuration information for MsgA preamble/payload, additional system information for a two-step random access procedure, etc.

A WCF (e.g., a WCF for two-step RACH) may generally convey waveform configuration information (e.g., CP-OFDM and DFT-s-OFDM waveform configurations for various UE scenarios, UE RRC states, channel measurements, position measurements, etc.). Example WCF structures are provided below in Tables 1-3, although various other structures or WCF bit configurations are possible to convey waveform configuration information, as discussed herein.

TABLE 1

Flag Bit Only (One Bit)
Flag Bit

| |
|---|
| 0: fall-back to 4-step RACH Msg3 waveform |
| 1: enabling waveform configuration for MsgA payload |

TABLE 2

Flag Bit + Bit Map (Multiple Bits)

| Flag Bit | MsgA Scenario #0 | MsgA Scenario #1 | ... |
|---|---|---|---|
| 0: fall-back to 4-step RACH Msg3 waveform 1: enabling waveform configuration for MsgA payload | 0: DFT-s-OFDM 1: CP-OFDM | 0: DFT-s-OFDM 1: CP-OFDM | 0: DFT-s-OFDM 1: CP-OFDM |

TABLE 3

Flag Bit + Scenario Indexing (Multiple Bits)

| Flag Bit | Index of 1st Scenario w/waveform different from Msg3 | Index of 2nd Scenario w/waveform different from Msg3 | ... |
|---|---|---|---|
| 0: fall-back to 4-step RACH Msg3 waveform 1: enabling waveform configuration for MsgA payload | X | Y | ... |

In the example tables above, a flag bit may be toggled between '0' and '1' to indicate whether MsgA may use Msg3 waveform (e.g., indicated in information field 510) or whether MsgA may use dynamic waveform (e.g., CP-OFDM waveform or DFT-s-OFDM waveform, depending on the waveform configuration and the UE scenario). In Table 1, other waveform configuration information may be sent, for example, in RRC configuration signaling when the flag bit indicates that waveform configuration for MsgA payload is enabled. In some cases, WCF may include a flag bit that indicates to a UE that the UE is to use one or more LUTs for autonomous uplink waveform configuration (and the UE may identify a waveform configuration for an autonomous uplink transmission based on the criteria of the LUT(s), such as, for example, channel measurement thresholds, UE RRC state, MCS used for the autonomous uplink transmission, positioning of the UE within the cell, etc.). In Table 2, WCF may include waveform configurations for various scenarios (e.g., for channel measurement thresholds, RRC states of the UE, positioning or location of the UE within a cell, MCSs used by a UE, etc.). In Table 3, WCF may include information for waveform configuration by indexing various scenarios.

Generally, Table 1 may illustrate a WCF conveying an indication of whether flexible waveforms for autonomous uplink transmissions is supported. Table 2 and Table 3 may convey both indication of whether flexible waveforms for autonomous uplink transmissions is supported as well as waveform configuration for various scenarios. In some cases, a WCF bits (e.g., information exemplified by Table 2) may be configured to convey a waveform configuration for a set of specified or configured scenarios. In some cases, WCF bits (e.g., information exemplified by Table 3) may index scenarios and/or waveform configurations of some set of scenarios and/or waveform configurations (e.g., that are indicated in other signaling, such as RRC signaling or other broadcast signaling, that are predetermined or specified by the network in one or more LUTs, etc.).

For example, in addition to WCF information, various scenarios may be defined via other system information, or may be predefined or prespecified by the network. For example, in other SI, RRC signaling, other broadcast signaling, etc., a base station may convey various scenarios or categories, for autonomous uplink waveform configuration, to a UE. Example Table 4 illustrates an example of such information.

TABLE 4

Mapping Rules for MsgA Scenarios

| MsgA Scenario Index | RRC State | UE Capability | Threshold of UE Measurements (Pathloss, timing offset, ...) | Other Parameters |
|---|---|---|---|---|
| X00 | RRC_IDLE or RRC_INACTIVE | Low Tier UE | 144 dB, Timing Offset > CP | ... |
| X01 | RRC_CONNECTED | Premium UE | 144 dB, Timing Offset < CP | ... |
| ... | | | | |

In some cases, 'Other Parameters' may refer to parameters used to quantify various scenarios depending on the use case. Generally, mappings similar or analogous to the example mapping information included in Table 4 may give waveform configuration mappings to various scenarios (e.g., MsgA transmission scenarios). Generally, waveform configuration to MsgA transmission scenario mapping information may be preconfigured or specified by the network, may be conveyed to UEs via WCFs, RRC signaling, etc. As discussed herein, such scenarios may refer to channel measurements, position measurements, UE RRC states, MCSs or time/frequency resources used by a UE for an autonomous uplink transmission etc. (e.g., and waveform configurations may map to such scenarios).

Figure 6:
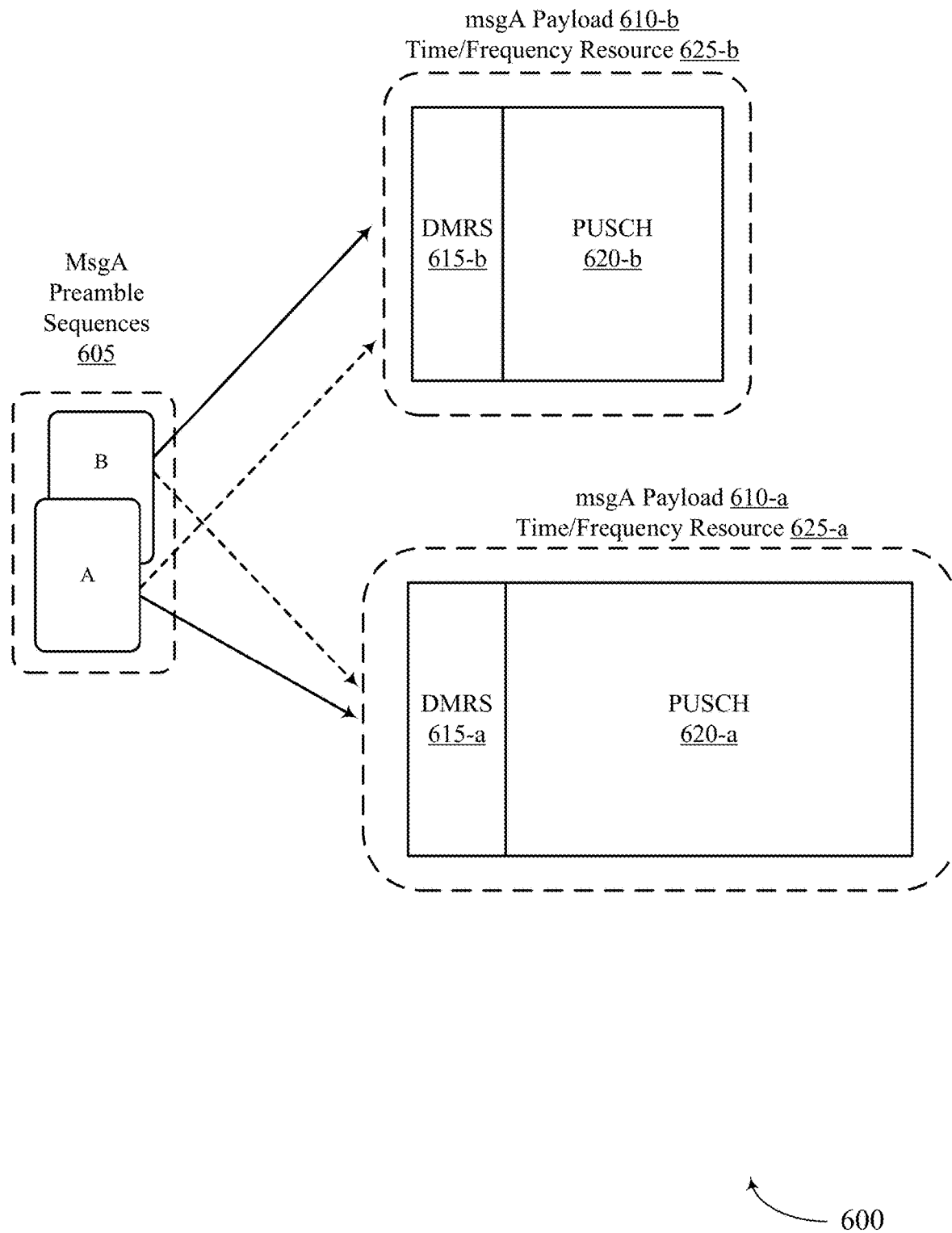
FIG. 6 illustrates an example of a random access message resource mapping that supports waveform configuration and indication for uplink transmission in accordance with aspects of the present disclosure.

FIG. 6 illustrates an example of a random access message resource mapping 600 that supports waveform configuration and indication for uplink transmission in accordance with aspects of the present disclosure. In some examples, random access message resource mapping 600 may implement aspects of wireless communications system 100 or wireless communications system 200.

FIG. 6, Table 5, and Table 6 may illustrate example joint waveform and resource configuration/indication by LUTs. Generally, flexible waveforms (e.g., CP-OFDM waveform or DFT-s-OFDM waveform) may be configured for autonomous uplink transmissions based on, for example, UE capabilities, RRC state of the UE, path loss conditions, channel measurements, cell size, MCS used by the UE, resource configuration (e.g., time/frequency resources) used by the UE, etc.

Specifically, FIG. 6, Table 5, and Table 6 may illustrate an example of waveform configuration based on resource configuration and preamble sequence 605 of a MsgA transmission. For example, depending on the resource configuration (whether time/frequency resources 625-a or time/frequency resources 625-b are used) and preamble sequence 605 for MsgA, waveform configuration may be associated with LUTs exemplified by Table 5 and Table 6. In the present example, if a MsgA preamble sequence A and time/frequency resources X (e.g., time/frequency resources 625-a) are used, LUT #1 may be referenced and a CP-OFDM waveform may be configured for the MsgA transmission. If a MsgA preamble sequence A and time/frequency resources Y (e.g., time/frequency resources 625-b) are used, LUT #2 may be referenced and a CP-OFDM waveform may be configured for the MsgA transmission. If a MsgA preamble sequence B and time/frequency resources Y (e.g., time/frequency resources 625-b) are used, LUT #1 may be referenced and a DFT-s-OFDM waveform may be configured for the MsgA transmission. If a MsgA preamble sequence B and time/frequency resources X (e.g., time/frequency resources 625-a) are used, LUT #2 may be referenced and a CP-OFDM waveform may be configured for the MsgA transmission.

TABLE 5

LUT #1

Resource Configuration for MsgA

| Preamble/DMRS Sequences | Time Frequency Resources Allocated for payload | Waveform for PUSCH |
|---|---|---|
| A | X | CP-OFDM |
| B | Y | DFT-s-OFDM |

TABLE 6

LUT #2

Resource Configuration for MsgA

| Preamble/DMRS Sequences | Time Frequency Resources Allocated for payload | Waveform for PUSCH |
|---|---|---|
| A | Y | CP-OFDM |
| B | X | CP-OFDM |

The example of FIG. 6 and Tables 5 and 6 are for illustrative purposes. Various other implementations of LUT waveform configuration (e.g., based on MCS used by the UE, RRC state of the UE, etc.) are possible by analogy, without departing from the scope of the present disclosure. In some cases, a UE may select a waveform (e.g., based on its position within a cell, based on its RRC state, etc.) and may select transmission parameters (e.g., preamble/DMRS sequences, time/frequency resources, etc.) based on the selected waveform and the LUTs. In some examples, a base station may be able to identify or determine which waveform the UE is using for an autonomous uplink transmission based on the preamble sequence and/or time/frequency resources used for the random access message transmission.

Figure 7:
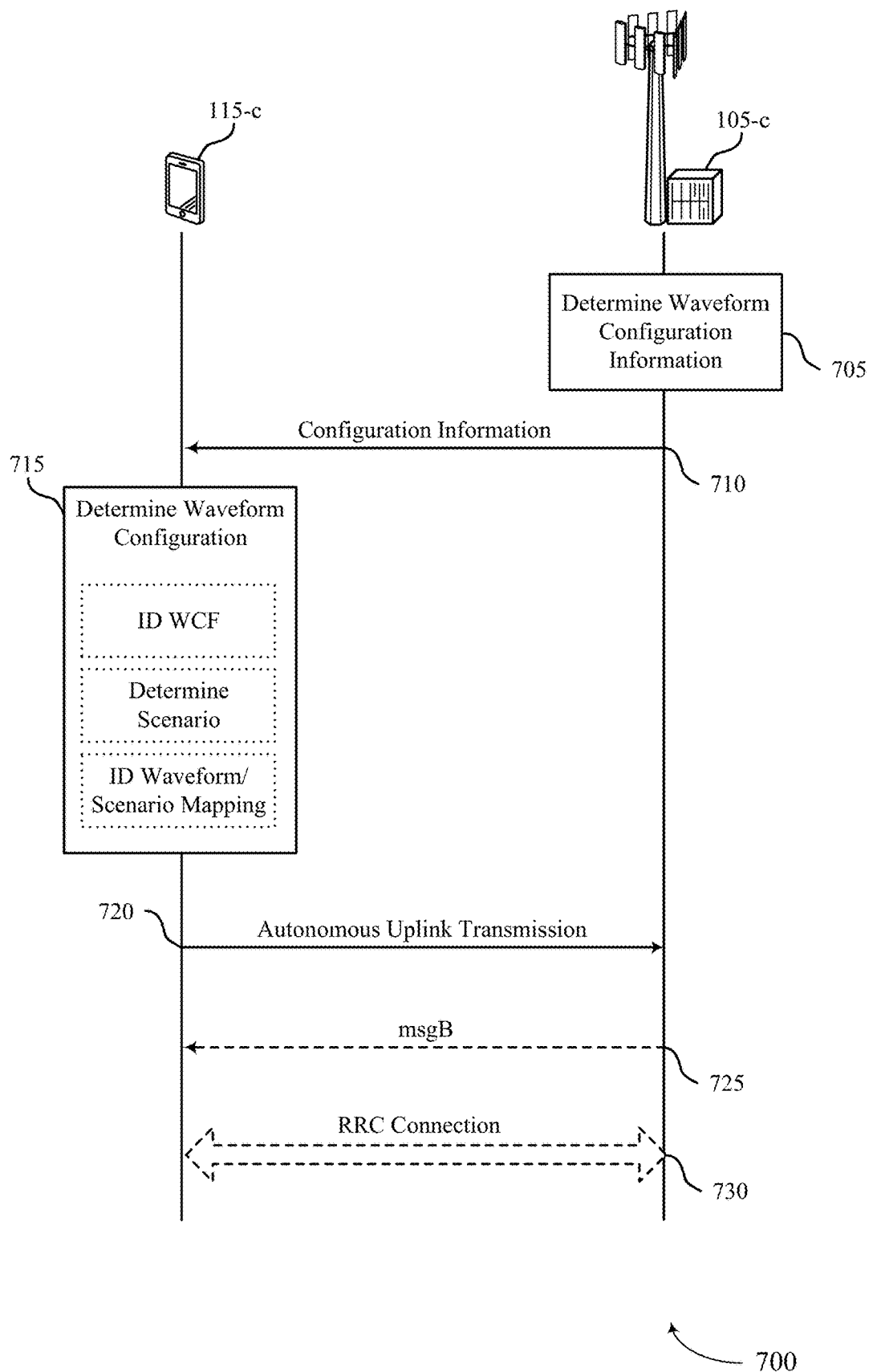
FIG. 7 illustrates an example of a process flow that supports waveform configuration and indication for uplink transmission in accordance with aspects of the present disclosure.

FIG. 7 illustrates an example of a process flow 700 that supports waveform configuration and indication for uplink transmission in accordance with aspects of the present disclosure. In some examples, process flow 700 may implement aspects of wireless communications system 100 or wireless communications system 200. Further, process flow 700 may be implemented by a UE 115-c and a base station 105-c, which may be examples of a UE 115 and a base station 105 described with reference to FIGS. 1-2. In the following description of the process flow 700, the operations between UE 115-c and base station 105-c may be transmitted in a different order than the order shown, or the operations performed by base station 105-c and UE 115-c may be performed in different orders or at different times. Certain operations may also be left out of the process flow 700, or other operations may be added to the process flow 700. It is to be understood that while base station 105-c and UE 115-c are shown performing a number of the operations of process flow 700, any wireless device may perform the operations shown.

At 705, base station 105-c may determine waveform configuration information. For example, base station 105-c may determine a waveform type of a plurality of supported waveform types for an autonomous uplink transmission by a UE 115-c. In some cases, this may include determining mapping rules between waveform types and various autonomous uplink transmission scenarios. Additionally or alternatively, such determining may include determining a waveform type based on positioning measurements, channel measurements, an RRC state of the UE, capability of the UE, etc.

At 710, base station 105-c may transmit broadcast signaling indicating a waveform configuration associated with the plurality of supported waveform types for the autonomous uplink transmission (based on the determined waveform configuration information). For example, the broadcast signaling may include a WCF, and may indicate whether flexible waveforms for autonomous uplink are supported, may explicitly configure a waveform type, may indicate waveform configuration mapping rules, etc.

At 715, UE 115-c may determine a waveform configuration (based at least in part on the received broadcast signaling). For example, UE 115-c may identify waveform configuration information from a WCF, may determine an autonomous uplink scenario (e.g., may perform channel measurements, identify a RRC state, identify autonomous uplink transmission parameters, etc.), or both, to determine a waveform configuration for an autonomous uplink transmission. In some examples, UE 115-c may identify a WCF, may determine that flexible waveforms for autonomous uplink are supported, and may identify a waveform configuration from the WCF. In other examples, UE 115-c may identify a WCF, may determine that flexible waveforms for autonomous uplink are supported, and may reference a LUT based on an autonomous uplink transmission scenario at the UE and/or based on autonomous uplink transmission parameters. In yet other examples, UE 115-c may identify a WCF, may determine that flexible waveforms for autonomous uplink are supported, and may identify waveform configuration/scenario mapping information from WCF (and may determine a waveform configuration based on the waveform configuration/scenario mapping information and the autonomous uplink scenario and/or autonomous uplink transmission parameters).

For example, UE 115-c may identify a mapping between one or more scenarios determined at the UE (e.g., autonomous uplink scenarios) and one or more corresponding waveform types (e.g., CP-OFDM waveform type or DFT-s-OFDM waveform type) of the plurality of supported waveform types, and the waveform type for transmitting an autonomous uplink transmission may be determined based on the mapping. In some cases, the mapping between the one or more scenarios determined at the UE and the one or more corresponding waveform types may be based on received broadcast signaling (e.g., configuration information at 710), additional broadcast signaling, radio resource control signaling, or a combination thereof.

Further, UE 115-c may determine a scenario at the UE (e.g., an autonomous uplink scenario), where the waveform type for transmitting an autonomous uplink transmission may be determined based on the scenario at the UE. As discussed herein, the scenario may include or refer to downlink channel measurements performed by the UE, positioning measurements, a timing offset value, a radio resource control state of the UE, a capability tier of the UE, a cell size associated with the received broadcast signaling, etc.

In some cases, the waveform configuration may be determined based on transmission parameters to be used by the UE 115-c for an autonomous uplink transmission. For example, UE 115-c may determine a waveform configuration based on an MCS, preamble/DMRS sequence, time/frequency resources, etc., that are to be used for an autonomous uplink transmission. As discussed herein, the waveform configuration may be determined based on the transmission parameters and a mapping between the transmission parameters and a waveform type. In some cases, the mapping may be included in a LUT, may be indicated in a WCF, etc. As such, the UE 115-c may identify a mapping between one or more of the sets of supported waveform types and one or more transmission parameters for transmitting the autonomous uplink transmission from one or more LUTs stored at the UE 115-c, where the autonomous uplink transmission may later be transmitted based on the one or more transmission parameters corresponding to the determined waveform type from the one or more LUTs. In some cases, transmission parameters may refer to an MCS, a preamble sequence, a DMRS sequence, time/frequency resources, a payload (e.g., a size of a MsgA payload), or some combination thereof.

As discussed, in some examples, the UE 115-c may decode a WCF from the broadcast signaling, and the WCF may indicate whether flexible waveform configuration is available to the UE 115-c. The WCF may include a flag bit that indicates that flexible waveform configuration is available to the UE with a first bit value and that indicates a default waveform configuration with a second bit value. In some cases, the WCF may further include a set of scenario bits, wherein each scenario bit of the set of scenario bits indicates for each corresponding scenario a first waveform type of the set of supported waveform types with a first bit value and indicates a second waveform type of the set of supported waveform types with a second bit value. In some cases, the WCF may include a set of indexes, wherein each index of the set of indexes indicates a scenario for using a waveform type that differs from a default waveform type.

In some cases, the waveform configuration may include a WCF, a transmission occasion configuration for the autonomous uplink transmission, additional system information for the autonomous uplink transmission, or a combination thereof. In some cases, the configuration information at 710 may be included in, or may refer to, a SIB (e.g., a SIB1).

At 720, UE 115-c may transmit an autonomous uplink transmission to the base station 105-c (e.g., according to the determine waveform type).

In examples where the autonomous uplink transmission refers to a MsgA of a two-step random access procedure, base station 105-c may receive the MsgA and may transmit a random access response (e.g., a MsgB) at 725. In some examples, the UE 115-c and the base station 105-c may establish a connection, at 730, based on the completed two-step random access procedure.

Figure 8:
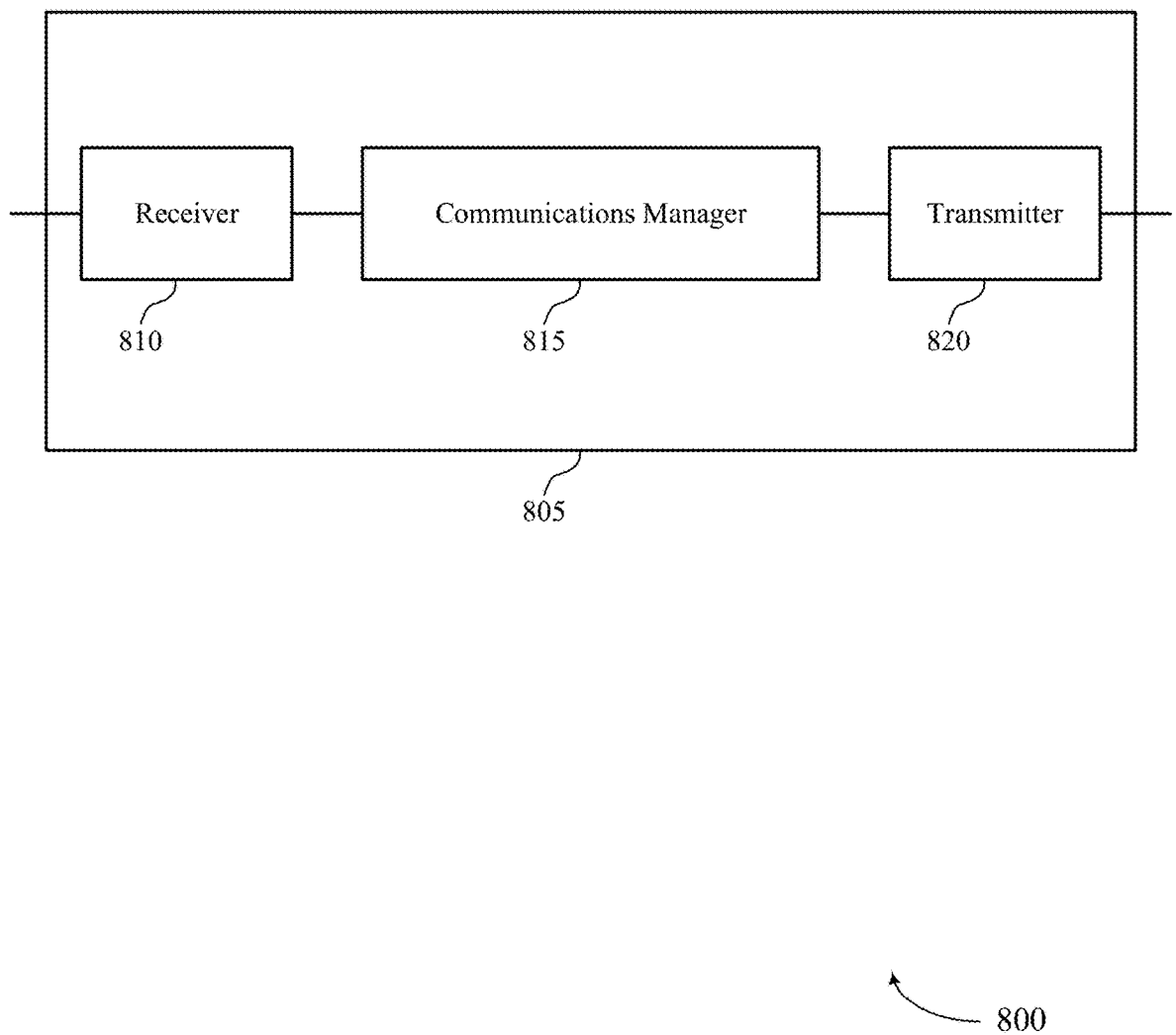
FIGS. 8 and 9 show block diagrams of devices that support waveform configuration and indication for uplink transmission in accordance with aspects of the present disclosure.

FIG. 8 shows a block diagram 800 of a device 805 that supports waveform configuration and indication for uplink transmission in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to waveform configuration and indication for uplink transmission, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive broadcast signaling indicating a waveform configuration associated with a set of supported waveform types for an autonomous uplink transmission, determine a waveform type of the set of supported waveform types for transmitting the autonomous uplink transmission based on the waveform configuration, and transmit the autonomous uplink transmission according to the determined waveform type. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications 815 as described herein may be implemented to realize one or more potential advantages. One implementation may allow a UE 115 to provide improved quality and reliability of service at the UE 115, as latency and the number of separate resources allocated to the UE 115 may be reduced due to efficient random access procedures using flexible waveform configurations.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
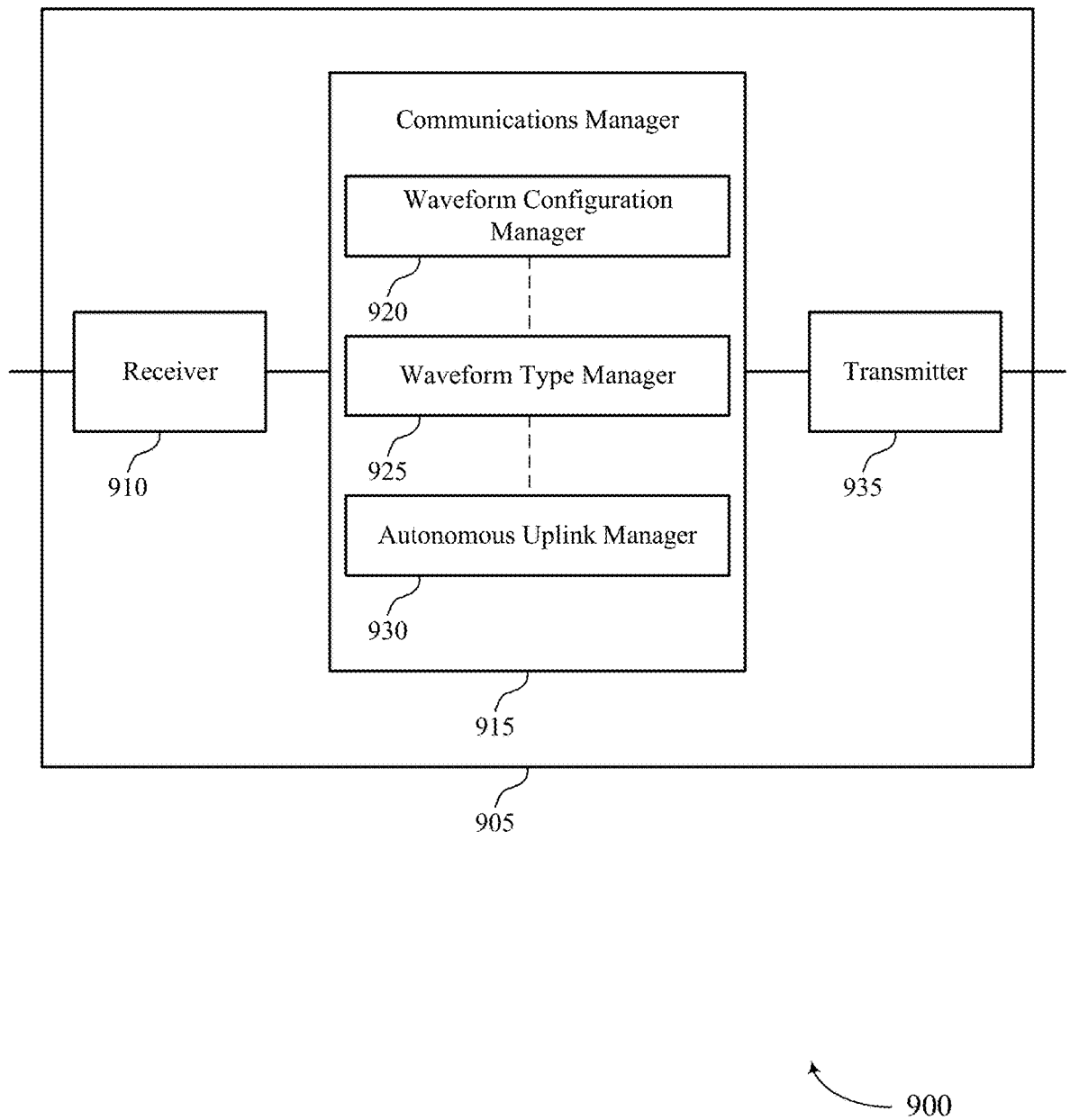

FIG. 9 shows a block diagram 900 of a device 905 that supports waveform configuration and indication for uplink transmission in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to waveform configuration and indication for uplink transmission, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a waveform configuration manager 920, a waveform type manager 925, and an autonomous uplink manager 930. The communications manager 915 may be an example of aspects of the communications manager 1110 described herein.

The waveform configuration manager 920 may receive broadcast signaling indicating a waveform configuration associated with a set of supported waveform types for an autonomous uplink transmission. The waveform type manager 925 may determine a waveform type of the set of supported waveform types for transmitting the autonomous uplink transmission based on the waveform configuration. The autonomous uplink manager 930 may transmit the autonomous uplink transmission according to the determined waveform type.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
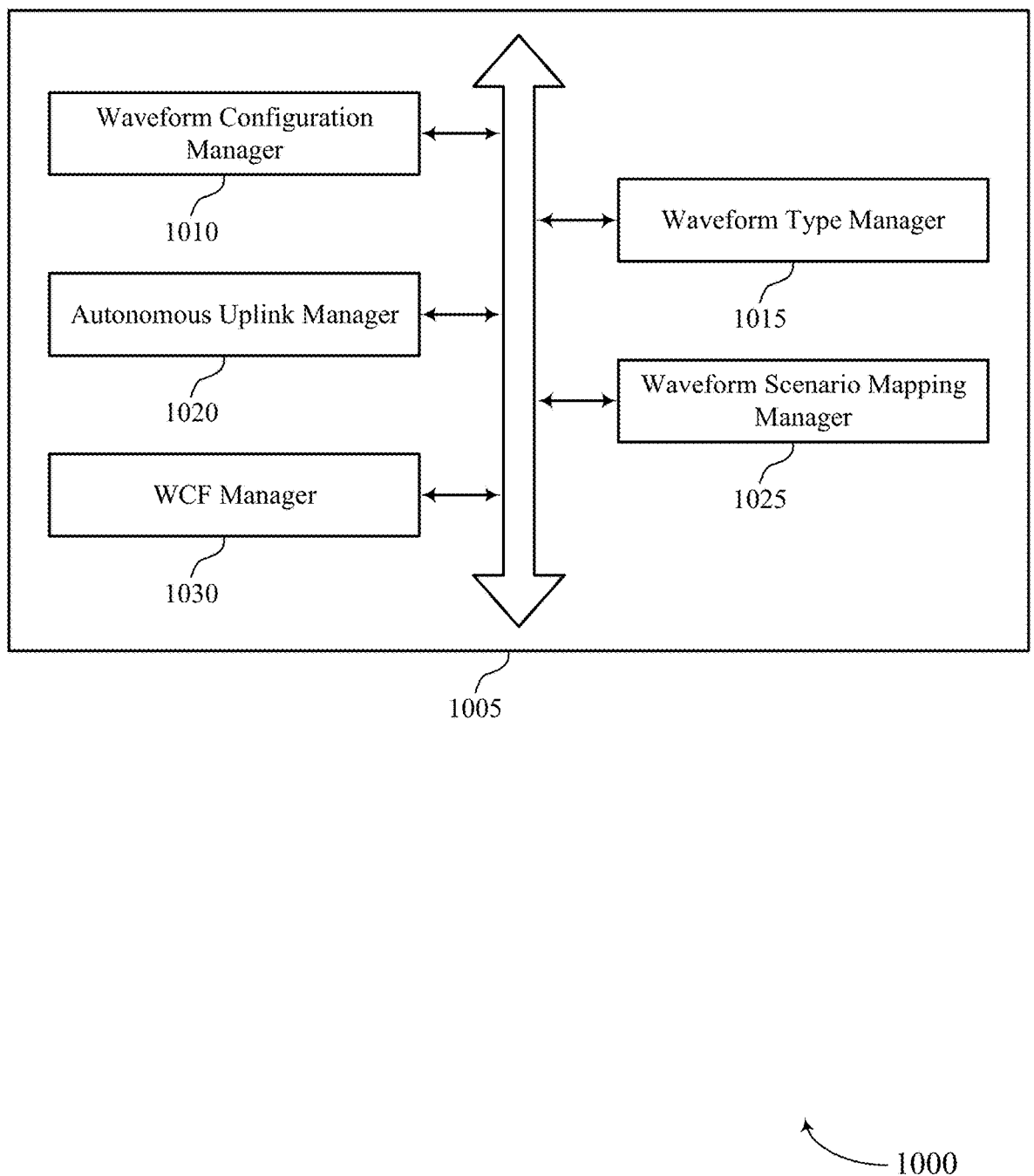
FIG. 10 shows a block diagram of a communications manager that supports waveform configuration and indication for uplink transmission in accordance with aspects of the present disclosure.

FIG. 10 shows a block diagram 1000 of a communications manager 1005 that supports waveform configuration and indication for uplink transmission in accordance with aspects of the present disclosure. The communications manager 1005 may be an example of aspects of a communications manager 815, a communications manager 915, or a communications manager 1110 described herein. The communications manager 1005 may include a waveform configuration manager 1010, a waveform type manager 1015, an autonomous uplink manager 1020, a waveform scenario mapping manager 1025 (e.g., a waveform-to-scenario mapping manager), and a WCF manager 1030. Each of these modules may communicate, directly or indirectly, with one another (e.g., via one or more buses).

The waveform configuration manager 1010 may receive broadcast signaling indicating a waveform configuration associated with a set of supported waveform types for an autonomous uplink transmission. In some examples, the waveform configuration manager 1010 may identify that a single waveform type of the set of supported waveform types is configured for the autonomous uplink transmission based on the received broadcast signaling. In some cases, the waveform configuration includes a waveform configuration field, a transmission occasion configuration for the autonomous uplink transmission, additional system information for the autonomous uplink transmission, or a combination thereof. In some cases, the broadcast signaling includes a system information block. In some cases, the set of supported waveform types include a cyclic-prefix orthogonal frequency division multiplexing waveform and a discrete Fourier transform spread orthogonal frequency division multiplexing waveform.

The waveform type manager 1015 may determine a waveform type of the set of supported waveform types for transmitting the autonomous uplink transmission based on the waveform configuration. The autonomous uplink manager 1020 may transmit the autonomous uplink transmission according to the determined waveform type. In some cases, the autonomous uplink transmission includes a first message of a two-step random access procedure.

The waveform scenario mapping manager 1025 may identify a mapping between one or more scenarios determined at the UE and one or more corresponding waveform types of the set of supported waveform types, where determining the waveform type for transmitting the autonomous uplink transmission is based on the mapping. In some examples, the waveform scenario mapping manager 1025 may identify the mapping between the one or more scenarios determined at the UE and the one or more corresponding waveform types based on the received broadcast signaling, additional broadcast signaling, radio resource control signaling, or a combination thereof. In some examples, the waveform scenario mapping manager 1025 may determine a scenario at the UE, where determining the waveform type for transmitting the autonomous uplink transmission is based on the scenario at the UE.

In some examples, the waveform scenario mapping manager 1025 may identify a mapping between one or more of the set of supported waveform types and one or more transmission parameters for transmitting the autonomous uplink transmission from one or more look up tables stored at the UE, where transmitting the autonomous uplink transmission is based on the one or more transmission parameters corresponding to the determined waveform type from the one or more look up tables. In some examples, the waveform scenario mapping manager 1025 may receive signaling indicating which of the one or more look up tables are applicable to the autonomous uplink transmission. In some cases, the scenario at the UE includes downlink channel measurements performed by the UE, positioning measurements, a timing offset value, a radio resource control state of the UE, a capability tier of the UE, a cell size associated with the received broadcast signaling, or a combination thereof. In some cases, the one or more transmission parameters for transmitting the autonomous uplink transmission include a set of preamble sequences, a set of demodulation reference signal sequences, time-frequency resources for transmitting a payload of the autonomous uplink transmission, or a combination thereof.

The WCF manager 1030 may decode a waveform configuration field from the broadcast signaling, where the waveform configuration field indicates whether flexible waveform configuration is available to the UE. In some cases, the waveform configuration field includes a flag bit that indicates that flexible waveform configuration is available to the UE with a first bit value and that indicates a default waveform configuration with a second bit value. In some cases, the waveform configuration field further includes a set of scenario bits, where each scenario bit of the set of scenario bits indicates for each corresponding scenario a first waveform type of the set of supported waveform types with a first bit value and indicates a second waveform type of the set of supported waveform types with a second bit value. In some cases, the waveform configuration field further includes a set of indexes, where each index of the set of indexes indicates a scenario for using a waveform type that differs from a default waveform type.

Figure 11:
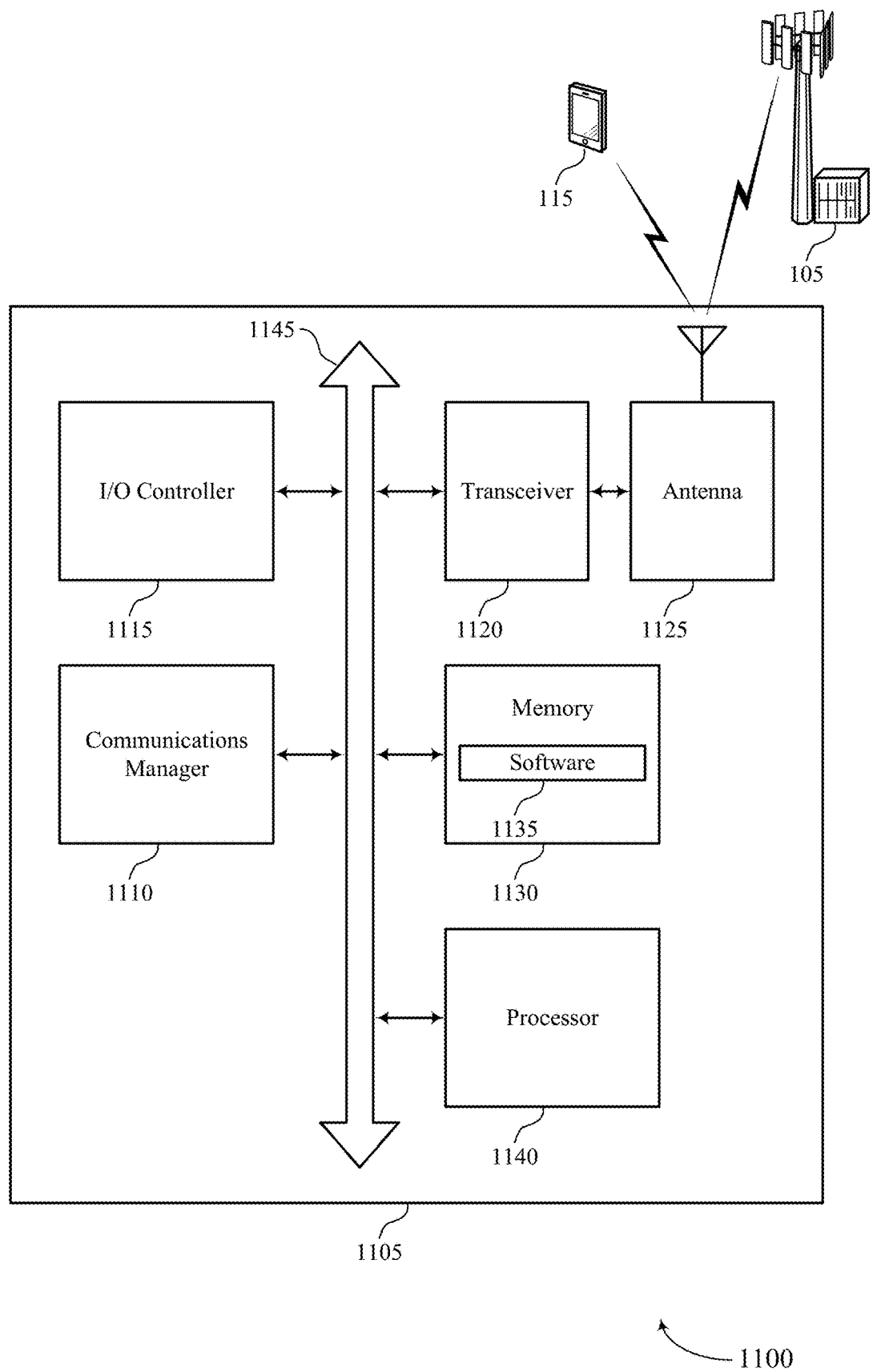
FIG. 11 shows a diagram of a system including a device that supports waveform configuration and indication for uplink transmission in accordance with aspects of the present disclosure.

FIG. 11 shows a diagram of a system 1100 including a device 1105 that supports waveform configuration and indication for uplink transmission in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication (e.g., coupled) via one or more buses (e.g., bus 1145).

The communications manager 1110 may receive broadcast signaling indicating a waveform configuration associated with a set of supported waveform types for an autonomous uplink transmission, determine a waveform type of the set of supported waveform types for transmitting the autonomous uplink transmission based on the waveform configuration, and transmit the autonomous uplink transmission according to the determined waveform type.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code or software 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting waveform configuration and indication for uplink transmission).

Based on flexible waveform configurations, a processor 1140 of a UE 115 may be able to provide a lower latency than using conventional random access methods. This lower latency and higher efficiency may lead to a reduced number of computations or computational complexity which may lead to greater power savings.

The software 1135 may include instructions to implement aspects of the present disclosure, including instructions to support wireless communications. The software 1135 may be stored in a non-transitory computer-readable medium such as system memory or other type of memory. In some cases, the software 1135 may not be directly executable by the processor 1140 but may cause a computer (e.g., when compiled and executed) to perform functions described herein.

Figure 12:
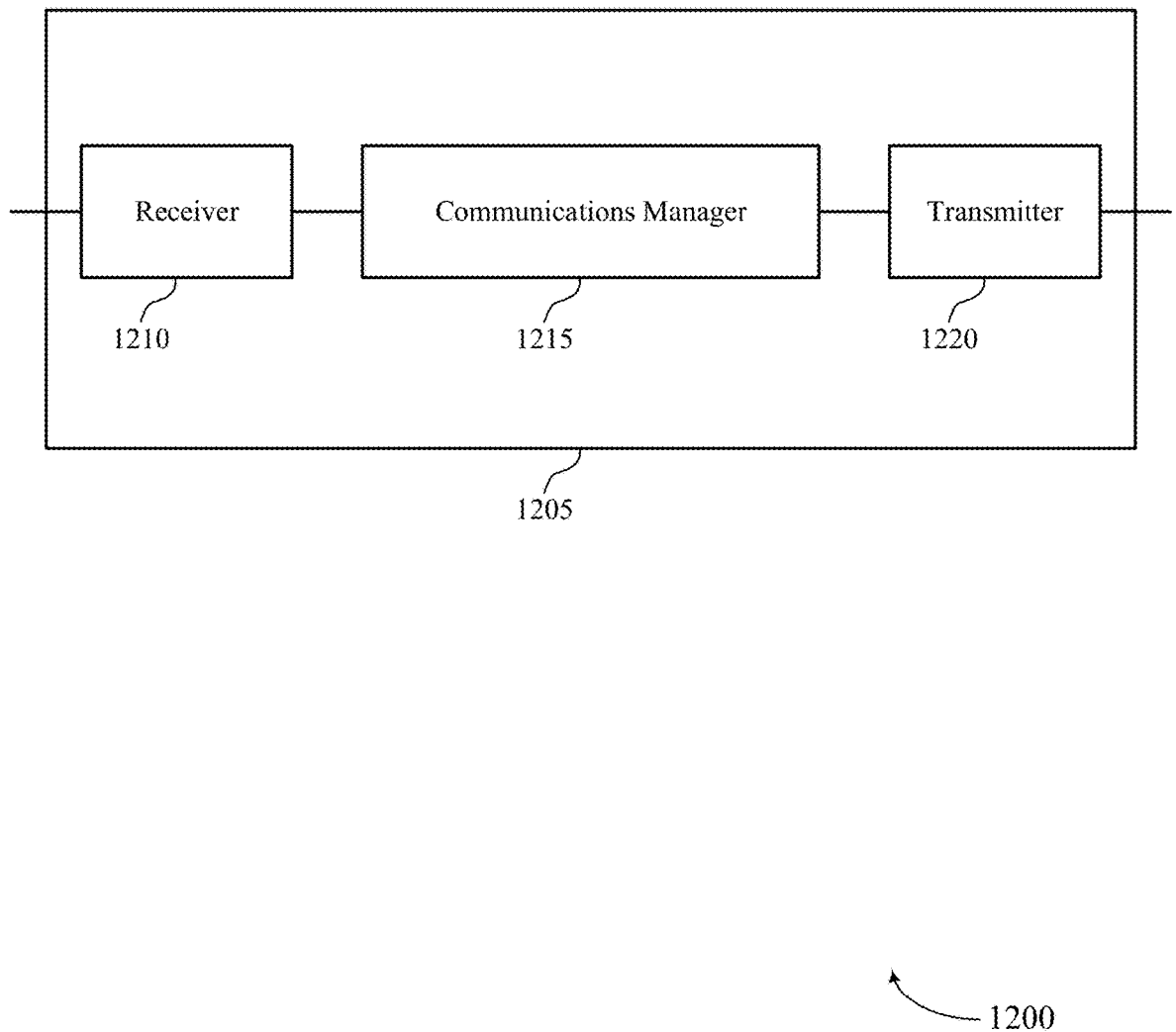
FIGS. 12 and 13 show block diagrams of devices that support waveform configuration and indication for uplink transmission in accordance with aspects of the present disclosure.

FIG. 12 shows a block diagram 1200 of a device 1205 that supports waveform configuration and indication for uplink transmission in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to waveform configuration and indication for uplink transmission, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may determine a waveform type of a set of supported waveform types for an autonomous uplink transmission, transmit broadcast signaling indicating a waveform configuration associated with the set of supported waveform types for the autonomous uplink transmission, and receive the autonomous uplink transmission according to the determined waveform type. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications 1215 as described herein may be implemented to realize one or more potential advantages. One implementation may allow a base station 105 to provide improved quality and reliability of service at the base station 105, as latency may be reduced due to efficient random access procedures using flexible waveform configurations.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
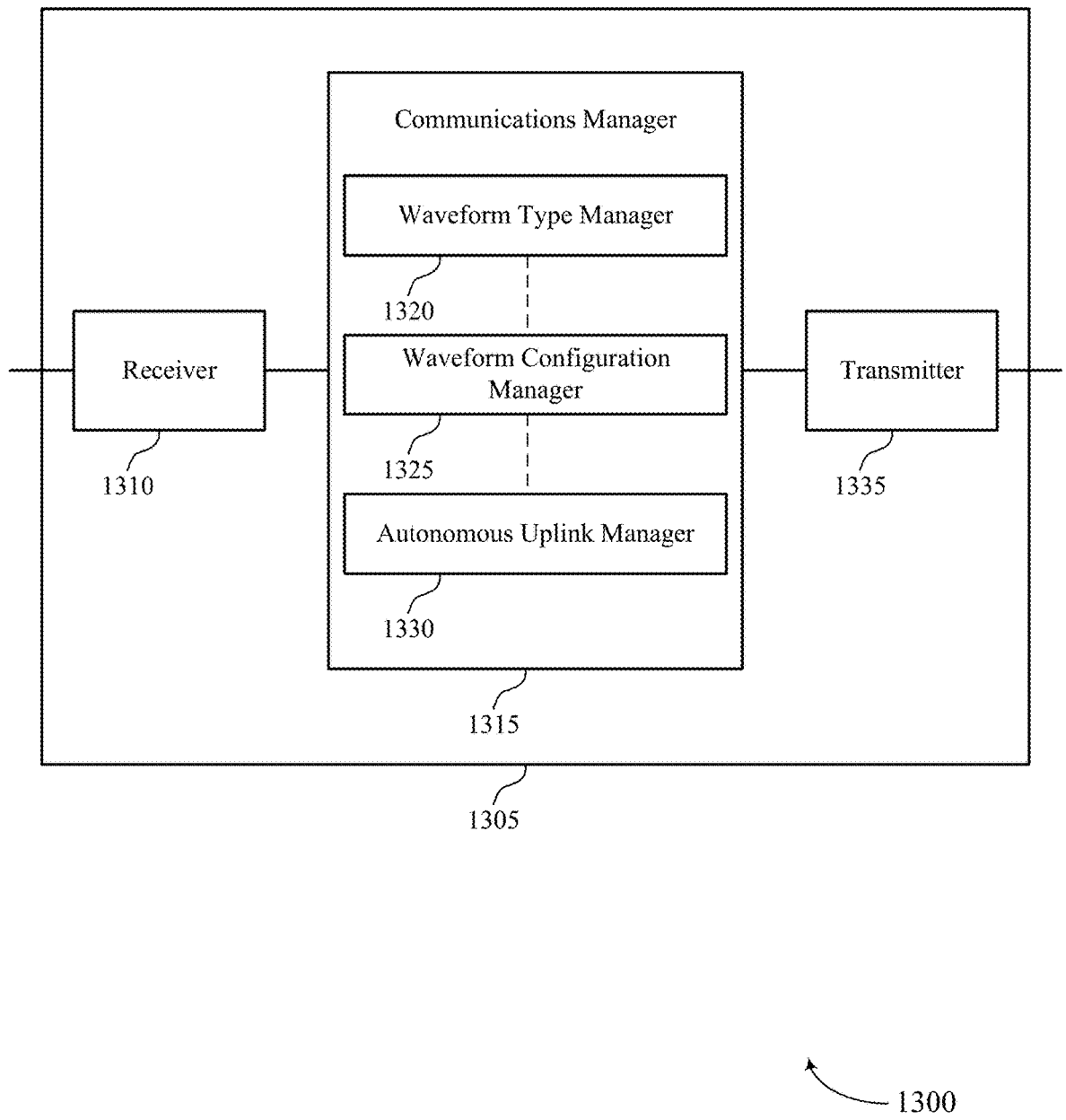

FIG. 13 shows a block diagram 1300 of a device 1305 that supports waveform configuration and indication for uplink transmission in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to waveform configuration and indication for uplink transmission, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a waveform type manager 1320, a waveform configuration manager 1325, and an autonomous uplink manager 1330. The communications manager 1315 may be an example of aspects of the communications manager 1510 described herein.

The waveform type manager 1320 may determine a waveform type of a set of supported waveform types for an autonomous uplink transmission. The waveform configuration manager 1325 may transmit broadcast signaling indicating a waveform configuration associated with the set of supported waveform types for the autonomous uplink transmission. The autonomous uplink manager 1330 may receive the autonomous uplink transmission according to the determined waveform type.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
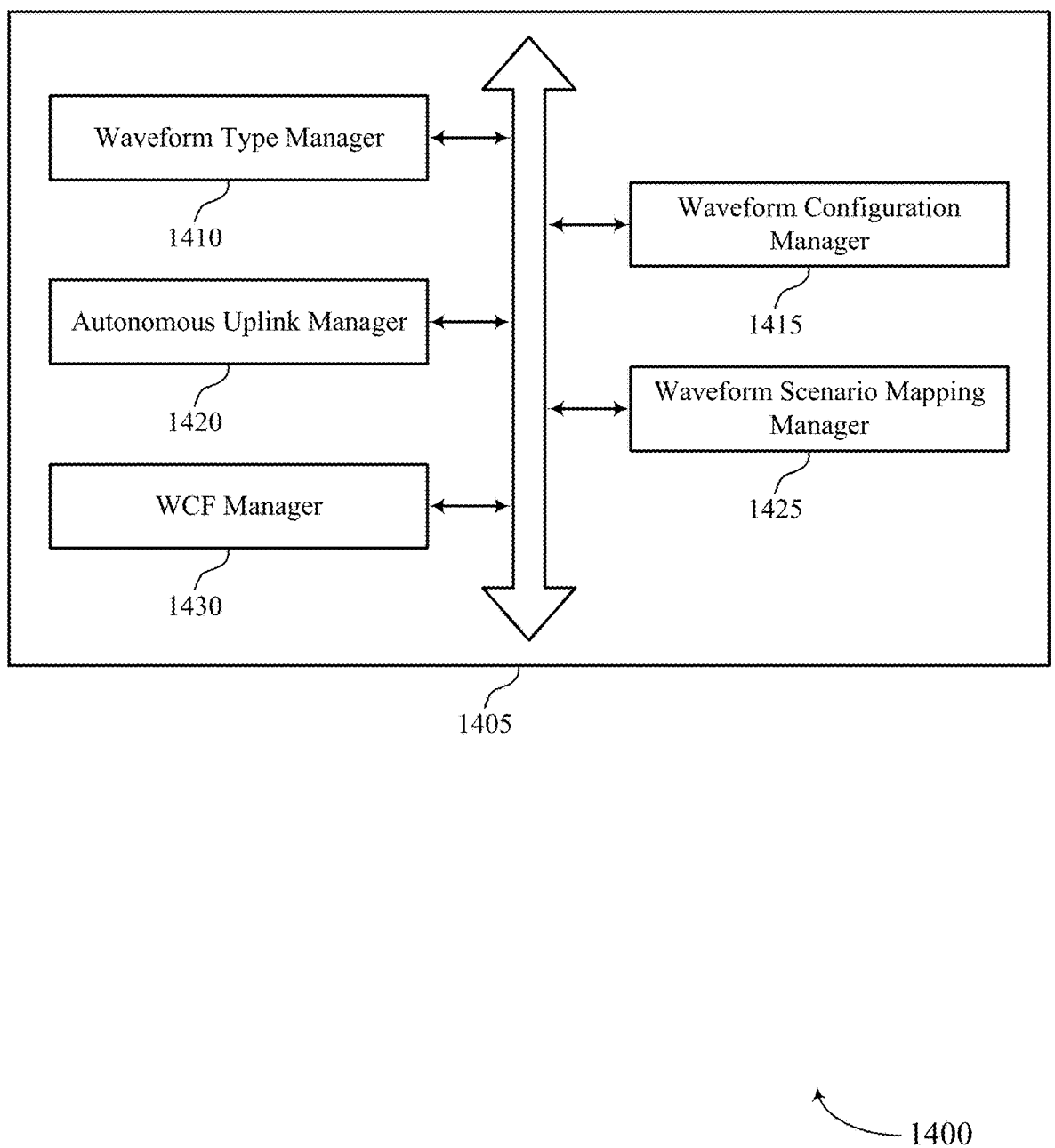
FIG. 14 shows a block diagram of a communications manager that supports waveform configuration and indication for uplink transmission in accordance with aspects of the present disclosure.

FIG. 14 shows a block diagram 1400 of a communications manager 1405 that supports waveform configuration and indication for uplink transmission in accordance with aspects of the present disclosure. The communications manager 1405 may be an example of aspects of a communications manager 1215, a communications manager 1315, or a communications manager 1510 described herein. The communications manager 1405 may include a waveform type manager 1410, a waveform configuration manager 1415, an autonomous uplink manager 1420, a waveform scenario mapping manager 1425, and a WCF manager 1430. Each of these modules may communicate, directly or indirectly, with one another (e.g., via one or more buses).

The waveform type manager 1410 may determine a waveform type of a set of supported waveform types for an autonomous uplink transmission. In some cases, the set of supported waveform types include a cyclic-prefix orthogonal frequency division multiplexing waveform and a discrete Fourier transform spread orthogonal frequency division multiplexing waveform.

The waveform configuration manager 1415 may transmit broadcast signaling indicating a waveform configuration associated with the set of supported waveform types for the autonomous uplink transmission. In some cases, the broadcast signaling indicates a single waveform type of the set of supported waveform types is configured for the autonomous uplink transmission. In some cases, the waveform configuration includes a waveform configuration field, a transmission occasion configuration for the autonomous uplink transmission, additional system information for the autonomous uplink transmission, or a combination thereof. In some cases, the broadcast signaling includes a system information block.

The autonomous uplink manager 1420 may receive the autonomous uplink transmission according to the determined waveform type. In some cases, the autonomous uplink transmission includes a first message of a two-step random access procedure.

The waveform scenario mapping manager 1425 may identify a mapping between one or more scenarios determined at a UE and one or more corresponding waveform types of the set of supported waveform types, where determining the waveform type of the set of supported waveform types is based on the mapping. In some examples, the waveform scenario mapping manager 1425 may transmit an indication of the mapping between the one or more scenarios determined at the UE and the one or more corresponding waveform types via the broadcast signaling, additional broadcast signaling, radio resource control signaling, or a combination thereof. In some examples, the waveform scenario mapping manager 1425 may identify a mapping between one or more of the set of supported waveform types and one or more UE transmission parameters for transmitting the autonomous uplink transmission from one or more look up tables stored at a UE, where the autonomous uplink transmission is received based on the one or more UE transmission parameters corresponding to the determined waveform type from the one or more look up tables.

In some examples, the waveform scenario mapping manager 1425 may transmit signaling indicating which of the one or more look up tables are applicable to the autonomous uplink transmission. In some cases, the one or more scenarios determined at the UE includes downlink channel measurements performed by the UE, positioning measurements, a timing offset value, a radio resource control state of the UE, a capability tier of the UE, a cell size associated with the received broadcast signaling, or a combination thereof.

The WCF manager 1430 may configure broadcast signaling to include a waveform configuration field indicating whether flexible waveform configuration is available to a UE. In some cases, the waveform configuration field includes a flag bit that indicates that flexible waveform configuration is available to the UE with a first bit value and that indicates a default waveform configuration with a second bit value. In some cases, the waveform configuration field further includes a set of scenario bits, where each scenario bit of the set of scenario bits indicates for each corresponding scenario a first waveform type of the set of supported waveform types with a first bit value and indicates a second waveform type of the set of supported waveform types with a second bit value. In some cases, the waveform configuration field further includes a set of indexes, where each index of the set of indexes indicates a scenario for using a waveform type that differs from a default waveform type.

Figure 15:
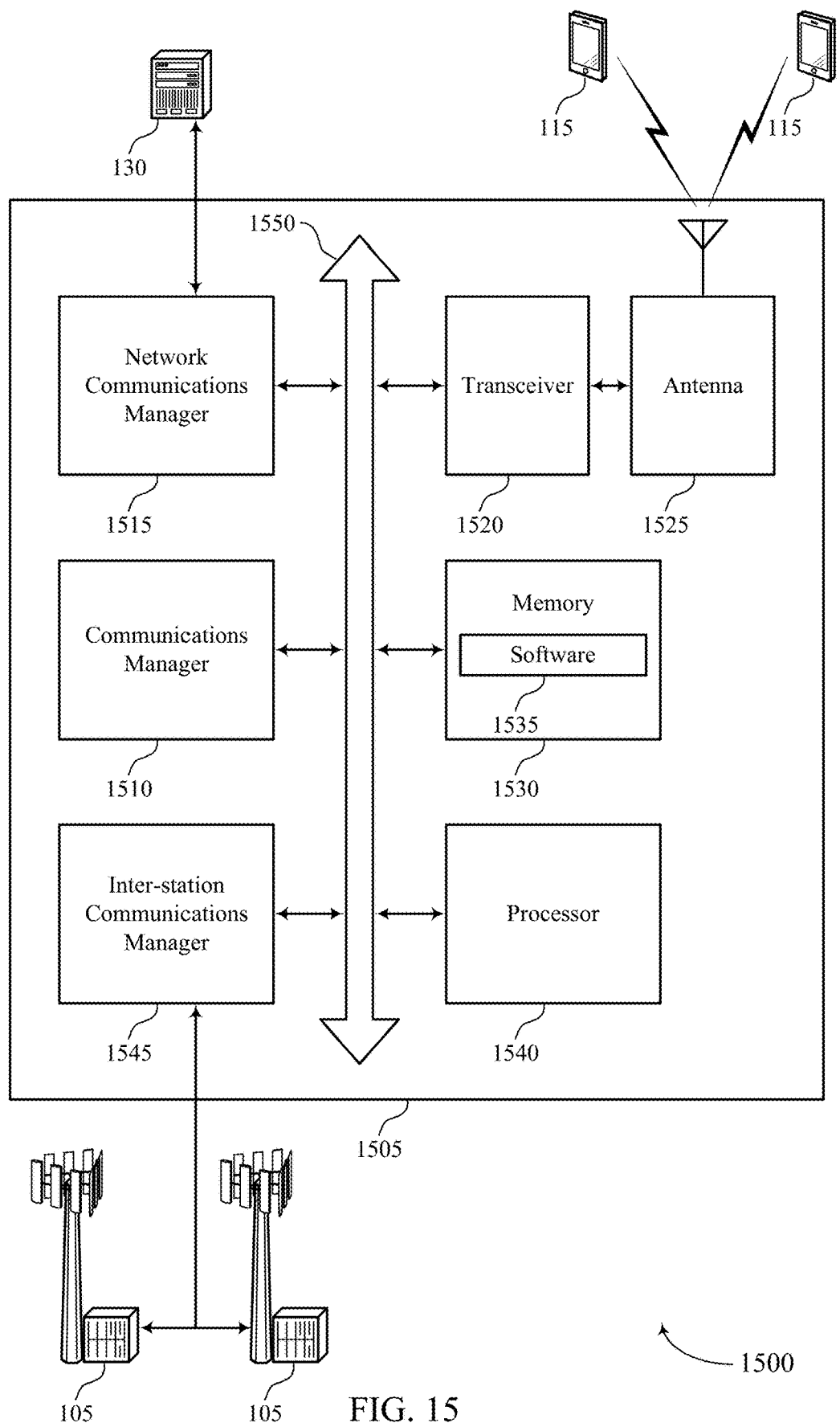
FIG. 15 shows a diagram of a system including a device that supports waveform configuration and indication for uplink transmission in accordance with aspects of the present disclosure.

FIG. 15 shows a diagram of a system 1500 including a device 1505 that supports waveform configuration and indication for uplink transmission in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication (e.g., coupled) via one or more buses (e.g., bus 1550).

The communications manager 1510 may determine a waveform type of a set of supported waveform types for an autonomous uplink transmission, transmit broadcast signaling indicating a waveform configuration associated with the set of supported waveform types for the autonomous uplink transmission, and receive the autonomous uplink transmission according to the determined waveform type.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code or software 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting waveform configuration and indication for uplink transmission).

Based on flexible waveform configurations, a processor 1540 of a base station 105 may be able to provide a lower latency than using conventional random access methods. This lower latency and higher efficiency may lead to a reduced number of computations or computational complexity which may lead to greater power savings.

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The software 1535 may include instructions to implement aspects of the present disclosure, including instructions to support wireless communications. The software 1535 may be stored in a non-transitory computer-readable medium such as system memory or other type of memory. In some cases, the software 1535 may not be directly executable by the processor 1540 but may cause a computer (e.g., when compiled and executed) to perform functions described herein.

Figure 16:
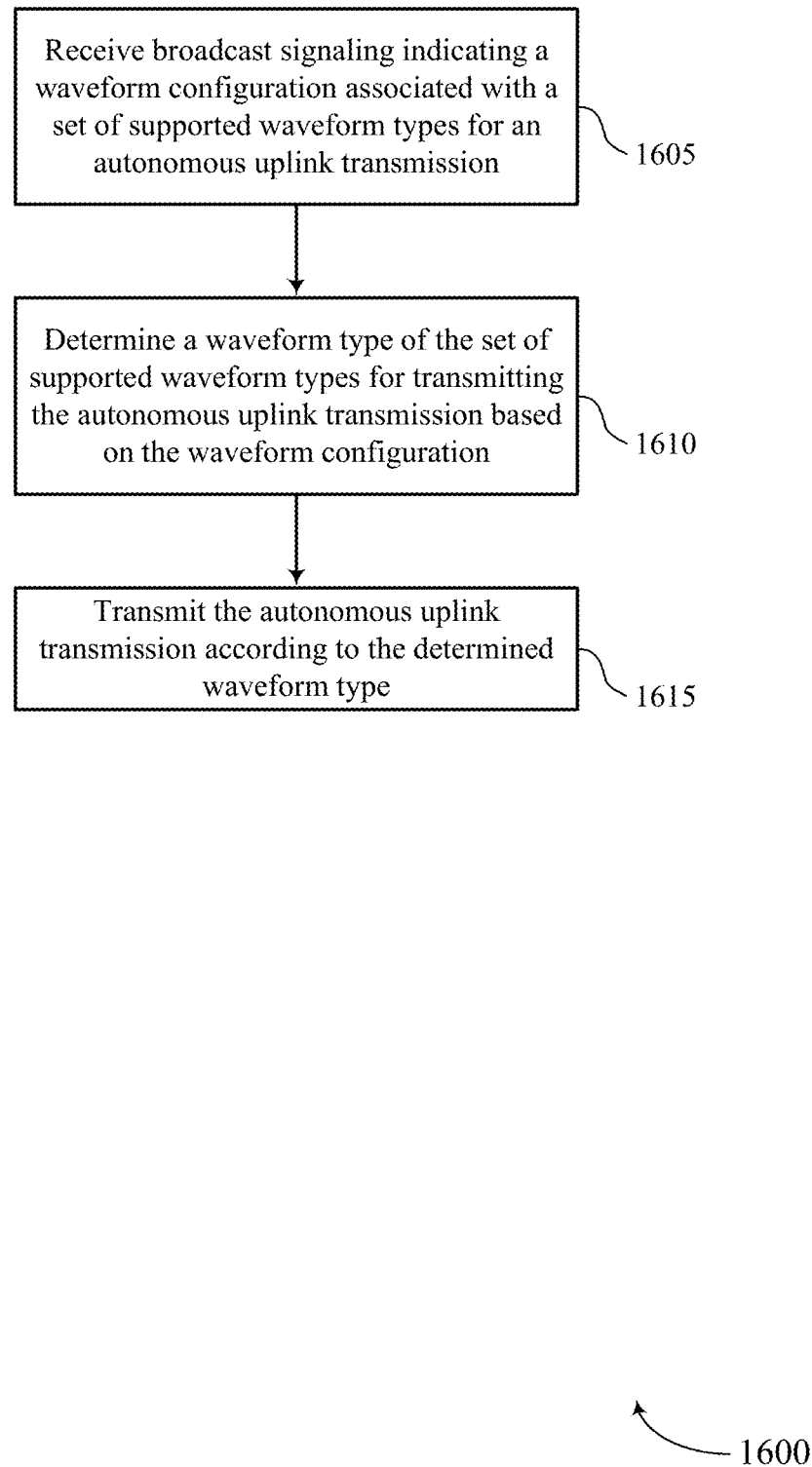
FIGS. 16 through 19 show flowcharts illustrating methods that support waveform configuration and indication for uplink transmission in accordance with aspects of the present disclosure.

FIG. 16 shows a flowchart illustrating a method 1600 that supports waveform configuration and indication for uplink transmission in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive broadcast signaling indicating a waveform configuration associated with a set of supported waveform types for an autonomous uplink transmission. The operations of 1605 may be performed according to the methods described herein. In some examples, aspects of the operations of 1605 may be performed by a waveform configuration manager as described with reference to FIGS. 8 through 11.

At 1610, the UE may determine a waveform type of the set of supported waveform types for transmitting the autonomous uplink transmission based on the waveform configuration. The operations of 1610 may be performed according to the methods described herein. In some examples, aspects of the operations of 1610 may be performed by a waveform type manager as described with reference to FIGS. 8 through 11.

At 1615, the UE may transmit the autonomous uplink transmission according to the determined waveform type. The operations of 1615 may be performed according to the methods described herein. In some examples, aspects of the operations of 1615 may be performed by an autonomous uplink manager as described with reference to FIGS. 8 through 11.

Figure 17:
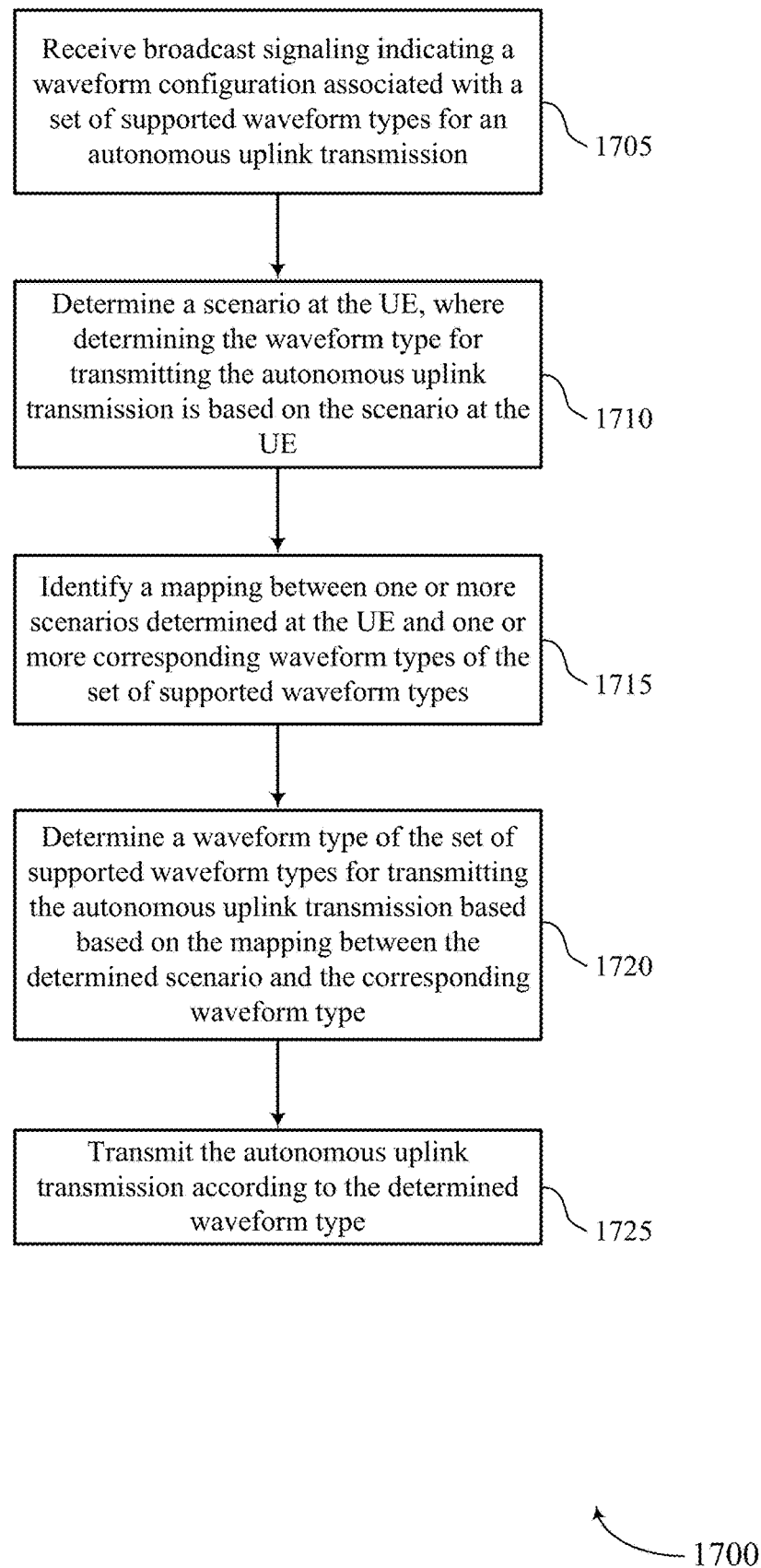

FIG. 17 shows a flowchart illustrating a method 1700 that supports waveform configuration and indication for uplink transmission in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive broadcast signaling indicating a waveform configuration associated with a set of supported waveform types for an autonomous uplink transmission. The operations of 1705 may be performed according to the methods described herein. In some examples, aspects of the operations of 1705 may be performed by a waveform configuration manager as described with reference to FIGS. 8 through 11.

At 1710, the UE may determine a scenario at the UE, where determining the waveform type for transmitting the autonomous uplink transmission is based on the scenario at the UE. The operations of 1710 may be performed according to the methods described herein. In some examples, aspects of the operations of 1710 may be performed by a waveform scenario mapping manager as described with reference to FIGS. 8 through 11.

At 1715, the UE may identify a mapping between one or more scenarios determined at the UE and one or more corresponding waveform types of the set of supported waveform types. The operations of 1715 may be performed according to the methods described herein. In some examples, aspects of the operations of 1715 may be performed by a waveform scenario mapping manager as described with reference to FIGS. 8 through 11.

At 1720, the UE may determine a waveform type of the set of supported waveform types for transmitting the autonomous uplink transmission based on the mapping between the determined scenario and the corresponding waveform type. The operations of 1720 may be performed according to the methods described herein. In some examples, aspects of the operations of 1720 may be performed by a waveform type manager as described with reference to FIGS. 8 through 11.

At 1725, the UE may transmit the autonomous uplink transmission according to the determined waveform type. The operations of 1725 may be performed according to the methods described herein. In some examples, aspects of the operations of 1725 may be performed by an autonomous uplink manager as described with reference to FIGS. 8 through 11.

Figure 18:
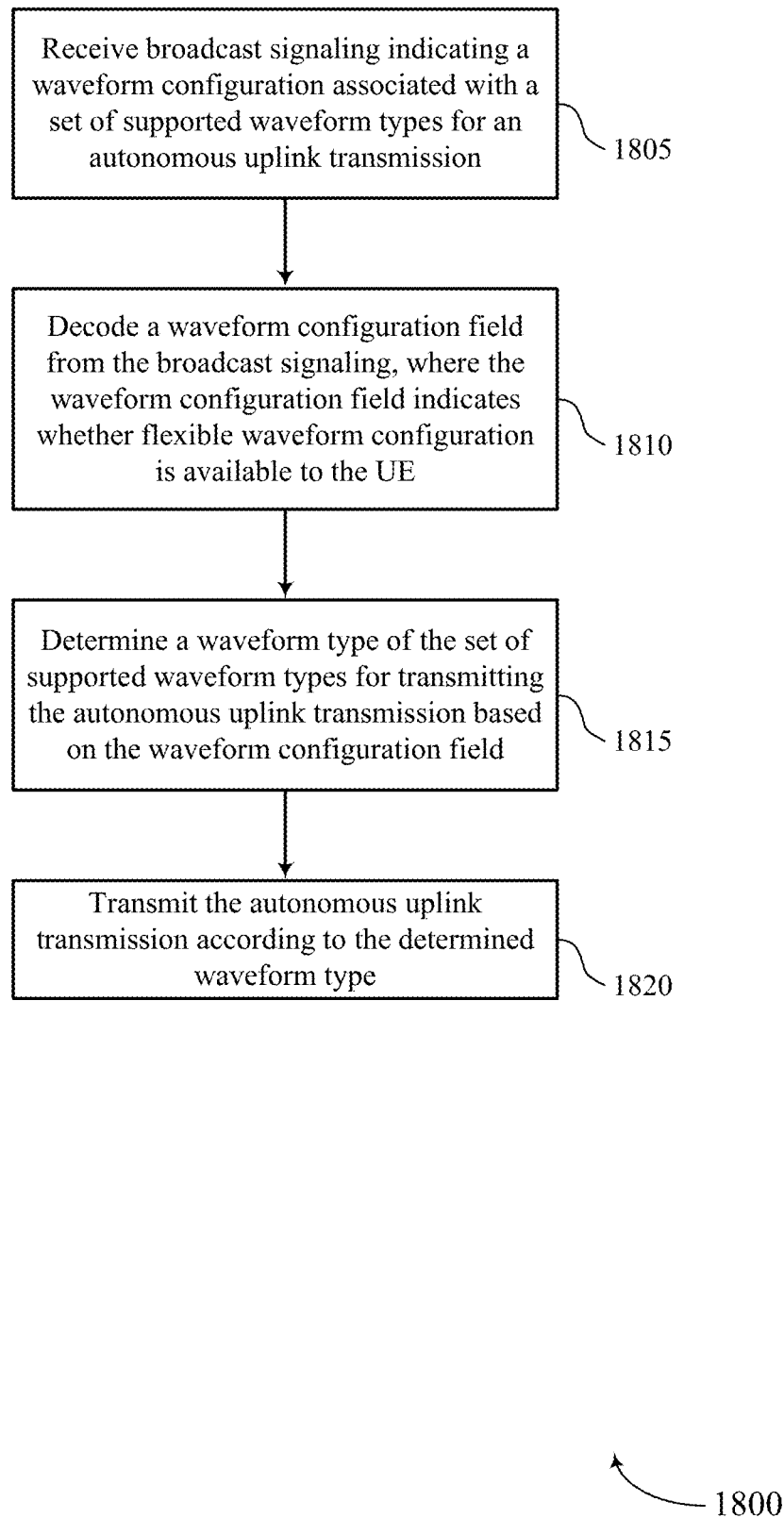

FIG. 18 shows a flowchart illustrating a method 1800 that supports waveform configuration and indication for uplink transmission in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive broadcast signaling indicating a waveform configuration associated with a set of supported waveform types for an autonomous uplink transmission. The operations of 1805 may be performed according to the methods described herein. In some examples, aspects of the operations of 1805 may be performed by a waveform configuration manager as described with reference to FIGS. 8 through 11.

At 1810, the UE may decode a waveform configuration field from the broadcast signaling, where the waveform configuration field indicates whether flexible waveform configuration is available to the UE. The operations of 1810 may be performed according to the methods described herein. In some examples, aspects of the operations of 1810 may be performed by a WCF manager as described with reference to FIGS. 8 through 11.

At 1815, the UE may determine a waveform type of the set of supported waveform types for transmitting the autonomous uplink transmission based on the waveform configuration field. The operations of 1815 may be performed according to the methods described herein. In some examples, aspects of the operations of 1815 may be performed by a waveform type manager as described with reference to FIGS. 8 through 11.

At 1820, the UE may transmit the autonomous uplink transmission according to the determined waveform type. The operations of 1820 may be performed according to the methods described herein. In some examples, aspects of the operations of 1820 may be performed by an autonomous uplink manager as described with reference to FIGS. 8 through 11.

Figure 19:
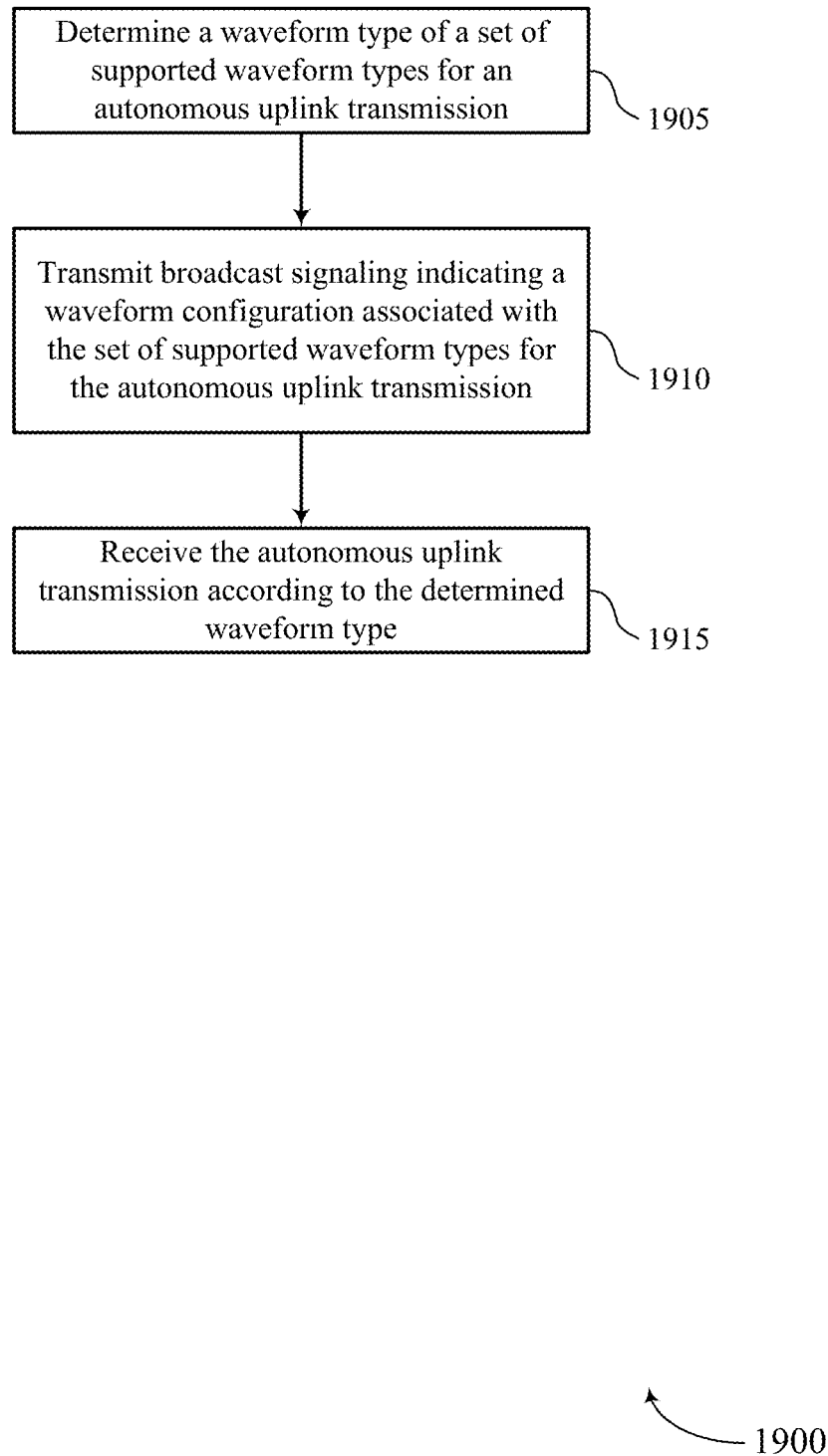

FIG. 19 shows a flowchart illustrating a method 1900 that supports waveform configuration and indication for uplink transmission in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may determine a waveform type of a set of supported waveform types for an autonomous uplink transmission. The operations of 1905 may be performed according to the methods described herein. In some examples, aspects of the operations of 1905 may be performed by a waveform type manager as described with reference to FIGS. 12 through 15.

At 1910, the base station may transmit broadcast signaling indicating a waveform configuration associated with the set of supported waveform types for the autonomous uplink transmission. The operations of 1910 may be performed according to the methods described herein. In some examples, aspects of the operations of 1910 may be performed by a waveform configuration manager as described with reference to FIGS. 12 through 15.

At 1915, the base station may receive the autonomous uplink transmission according to the determined waveform type. The operations of 1915 may be performed according to the methods described herein. In some examples, aspects of the operations of 1915 may be performed by an autonomous uplink manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving broadcast signaling indicating a waveform configuration associated with a plurality of supported waveform types for an autonomous uplink transmission; and
   transmitting the autonomous uplink transmission in accordance with a waveform type of the plurality of supported waveform types based at least in part on the waveform configuration.

2. The method of claim 1, further comprising:
   decoding a waveform configuration field from the broadcast signaling.

3. The method of claim 2, wherein decoding the waveform configuration field further comprises:
   decoding one or more waveform configuration bits of a field of the waveform configuration field.

4. The method of claim 2, wherein the waveform configuration field comprises a flag bit.

5. The method of claim 1, further comprising:
   identifying that a single waveform type of the plurality of supported waveform types is configured for the autonomous uplink transmission based at least in part on the received broadcast signaling.

6. The method of claim 5, wherein the single waveform type indicates a random access procedure type.

7. The method of claim 6, wherein the broadcast signaling is based at least in part on the random access procedure type.

8. The method of claim 1, wherein the waveform configuration comprises a waveform configuration field, a transmission occasion configuration for the autonomous uplink transmission, additional system information for the autonomous uplink transmission, or a combination thereof.

9. The method of claim 1, wherein the broadcast signaling comprises a system information block.

10. The method of claim 1, wherein the autonomous uplink transmission comprises a first message of a two-step random access procedure.

11. The method of claim 1, wherein the plurality of supported waveform types comprise a cyclic-prefix orthogonal frequency division multiplexing waveform and a discrete Fourier transform spread orthogonal frequency division multiplexing waveform.

12. A method for wireless communications at a base station, comprising:
transmitting broadcast signaling indicating a waveform configuration associated with a plurality of supported waveform types for an autonomous uplink transmission; and
receiving the autonomous uplink transmission in accordance with a waveform type of the plurality of supported waveform types based at least in part on the waveform configuration.

13. The method of claim 12, wherein the broadcast signaling comprises a waveform configuration field.

14. The method of claim 13, wherein the waveform configuration field comprises one or more waveform configuration bits of a field of the waveform configuration field.

15. The method of claim 13, wherein the waveform configuration field comprises a flag bit.

16. The method of claim 12, wherein the broadcast signaling indicates a single waveform type of the plurality of supported waveform types is configured for the autonomous uplink transmission.

17. The method of claim 16, wherein the single waveform type indicates a random access procedure type.

18. The method of claim 17, wherein the broadcast signaling is based at least in part on the random access procedure type.

19. The method of claim 12, wherein the waveform configuration comprises a waveform configuration field, a transmission occasion configuration for the autonomous uplink transmission, additional system information for the autonomous uplink transmission, or a combination thereof.

20. The method of claim 12, wherein the broadcast signaling comprises a system information block.

21. The method of claim 12, wherein the autonomous uplink transmission comprises a first message of a two-step random access procedure.

22. The method of claim 12, wherein the plurality of supported waveform types comprise a cyclic-prefix orthogonal frequency division multiplexing waveform and a discrete Fourier transform spread orthogonal frequency division multiplexing waveform.

23. An apparatus for wireless communications at a user equipment (UE), comprising:
one or more processors,
memory coupled with the one or more processors; and
instructions stored in the memory and executable by the one or more processors to cause the apparatus to:
receive broadcast signaling indicating a waveform configuration associated with a plurality of supported waveform types for an autonomous uplink transmission; and
transmit the autonomous uplink transmission in accordance with a waveform type of the plurality of supported waveform types based at least in part on the waveform configuration.

24. The apparatus of claim 23, wherein the instructions are further executable by the one or more processors to cause the apparatus to:
decode a waveform configuration field from the broadcast signaling.

25. The apparatus of claim 23, wherein the instructions are further executable by the one or more processors to cause the apparatus to:
identify that a single waveform type of the plurality of supported waveform types is configured for the autonomous uplink transmission based at least in part on the received broadcast signaling.

26. The apparatus of claim 23, wherein the plurality of supported waveform types comprise a cyclic-prefix orthogonal frequency division multiplexing waveform and a discrete Fourier transform spread orthogonal frequency division multiplexing waveform.

27. An apparatus for wireless communications at a base station, comprising:
one or more processors,
memory coupled with the one or more processors; and
instructions stored in the memory and executable by the one or more processors to cause the apparatus to:
transmit broadcast signaling indicating a waveform configuration associated with a plurality of supported waveform types for an autonomous uplink transmission; and
receive the autonomous uplink transmission in accordance with a waveform type of the plurality of supported waveform types based at least in part on the waveform configuration.

28. The apparatus of claim 27, wherein the broadcast signaling comprises a waveform configuration field.

29. The apparatus of claim 27, wherein the broadcast signaling indicates a single waveform type of the plurality of supported waveform types is configured for the autonomous uplink transmission.

30. The apparatus of claim 27, wherein the plurality of supported waveform types comprise a cyclic-prefix orthogonal frequency division multiplexing waveform and a discrete Fourier transform spread orthogonal frequency division multiplexing waveform.

* * * * *